(12) United States Patent
Osada et al.

(10) Patent No.: US 8,343,680 B2
(45) Date of Patent: Jan. 1, 2013

(54) FUEL CELL SYSTEM

(75) Inventors: Yasuhiro Osada, Nagoya (JP); Tetsuya Bono, Aichi-ken (JP); Masahiro Takeshita, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 815 days.

(21) Appl. No.: 12/513,443

(22) PCT Filed: Nov. 7, 2007

(86) PCT No.: PCT/JP2007/072051
§ 371 (c)(1),
(2), (4) Date: May 4, 2009

(87) PCT Pub. No.: WO2008/059851
PCT Pub. Date: May 22, 2008

(65) Prior Publication Data
US 2010/0035106 A1  Feb. 11, 2010

(30) Foreign Application Priority Data
Nov. 16, 2006  (JP) .................................. 2006-309989

(51) Int. Cl.
*H01M 8/04* (2006.01)
(52) U.S. Cl. ........................................ 429/446; 429/512
(58) Field of Classification Search .................. 429/446, 429/512
See application file for complete search history.

(56) References Cited

U.S. PATENT DOCUMENTS 3,159,506 A * 12/1964 Salathe ...................... 429/446 X
7,790,325 B2 * 9/2010 Shioya et al. ............. 429/512 X

FOREIGN PATENT DOCUMENTS

| DE | 11 2005 001 210 B4 | 7/2010 |
| JP | 63-151779 A | 6/1988 |
| JP | 2-006834 A | 1/1990 |
| JP | 06-094155 A | 4/1994 |
| JP | 2000-3717 A | 1/2000 |
| JP | 2000-003717 A | 1/2000 |
| JP | 2000-161509 A | 6/2000 |
| JP | 2004-006166 A | 1/2004 |
| JP | 2004-183706 A | 7/2004 |
| JP | 2004-183713 A | 7/2004 |
| JP | 2005-150090 A | 6/2005 |
| JP | 2005-190843 A | 7/2005 |
| JP | 2005-339847 A | 12/2005 |
| JP | 2006-155927 A | 6/2006 |
| WO | 2005/117181 A1 | 12/2005 |

OTHER PUBLICATIONS

Computer-generated English translation of Watabe et al. (JP 06-94155), from the Japanese Patent Office website (doc. date: Apr. 1994).*

(Continued)

*Primary Examiner* — Stephen J. Kalafut
(74) *Attorney, Agent, or Firm* — Kenyon & Kenyon LLP

(57) ABSTRACT

A shutoff valve provided on the entrance side and exit side of a fuel cell system has a diaphragm. A valve closing-side pressure chamber is provided on the upper face side of the diaphragm, and a valve opening-side pressure chamber is provided on the lower face side of the diaphragm. With the valve closing-side pressure chamber of the shutoff valve pressurized, the pressure in the chamber is maintained by ViS, Vic, and ViO in an electrically non-conducted state. Also, the pressure in the valve opening-side pressure chamber of the shutoff valve is maintained released. By this, force acting in the direction of closing a valving element acts on it through the diaphragm, maintaining the shutoff valve closed.

13 Claims, 14 Drawing Sheets

OTHER PUBLICATIONS

Office Action issued in CA 2,667,351 on Mar. 2, 2010.
Office Action issued Feb. 22, 2011 in DE 11 2007 002 775.4-45 and English translation thereof.

Office Action issued in CN Application No. 2007/80042518.X dated Mar. 10, 2011 & partial translation thereof.

* cited by examiner (CONNECTED TO FLUID FLOW PATH)

FUEL CELL SYSTEM

This is a 371 national phase application of PCT/JP2007/072051 filed 7 Nov. 2007, claiming priority to Japanese Patent Application No. JP 2006-309989 filed 16 Nov. 2006, the contents of which are incorporated herein by reference.

BACKGROUND OF INVENTION

1. Filed of the Invention

The present invention generally relates to a fuel cell system, and particularly to the art of controlling the open/closed state of a valve which is provided in a fluid flow path.

2. Description of the Related Art

Fuel cells are known that generate power by utilizing a fuel gas such as a hydrogen gas and an oxide gas such as ambient air. A fuel cell system may be mounted on vehicles, for example, and used as a power source. Obviously, the fuel cell system may be incorporated in applications other than vehicles.

The fuel cell system includes a fuel cell which generates power as a result of chemical reaction between the fuel gas and the oxide gas, and a fluid flow path which supplies reaction gases, such as the fuel gas and oxide gas, to the fuel cell, and discharges gas or liquid which are generated in the reaction.

Various techniques have been proposed heretofore in connection with a valve which is provided in the fluid flow path of such a fuel cell system.

For example, Japanese Patent Laid-Open Publication 2004-6166 (Patent Document 1) discloses a technique to seal a space containing a reaction gas in the fuel cell by providing opening/closing valves in feed/discharge lines of the reaction gas, and closing the opening/closing valves when the power generating operation of the fuel cell is stopped.

SUMMARY OF THE INVENTION

As mentioned above, Patent Document 1 discloses a technique to seal the reaction gas space in the fuel cell by closing the opening/closing valve when the power generation operation of the fuel cell is stopped. If, however, a solenoid valve is used as the opening/closing valve, and if it is a normally-open type solenoid valve, it is necessary to apply a control voltage continuously to the solenoid valve to close it when the power generating operation of the fuel cell is stopped. If the normally-closed type solenoid valve is used, it is also necessary to apply the control voltage continuously to the solenoid valve to open it during a power generating operation of the fuel cell. As such, a noticeable problem may arise in this technique in terms of power consumption.

In view of the above, the inventors of the present invention have been studying the way to control the open/closed state of the valves provided in the fluid flow paths of the fuel cell system.

The present invention has been made in the course of these studies, and an object of the present invention is to provide an improved technique regarding the control of the open/closed state of the valve used in the fuel cell system.

In one aspect, to achieve the above object, a fuel cell system according to a preferred embodiment of the present invention includes a fuel cell, a fluid flow path connected to the fuel cell, and a fluid control valve. The fluid control valve includes a valving element which is activated in response to a pressure difference between a valve opening pressure and a valve closing pressure, and a pressure chamber for applying either the valve opening pressure or the valve closing pressure to the valving element. The pressure chamber is sealed to maintain the open/closed state of the valving element.

In this configuration, the pressure chamber is sealed to maintain the interior pressure thereof. Therefore, it is not necessary to continuously apply a control voltage or the like to the valving element to maintain the valving element in the closed state. As a result, the power consumption for controlling the valve or the like can be reduced.

It is noted that, in the above configuration, the fluid control valve includes the pressure chamber corresponding to either the valve opening pressure or the valve closing pressure, but the fluid control valve may include two pressure chambers corresponding to the opening and closing pressures, respectively. It is also noted that, in addition to the interior pressure of the pressure chamber, force applied to the valving element may include a direct pressure applied by an incoming fluid to the fluid control valve, a spring force created by springs provided in the fluid control valve, a freezing force to fix the valving element by freezing, and so on.

In a preferred embodiment, of the valve opening pressure and the valve closing pressure of the fluid control valve, one valve pressure is greater than the other valve pressure in the normal state. In the abnormal state, the other valve pressure is greater than the one valve pressure when the pressure chamber corresponding to the other valve pressure is sealed.

In this configuration, it is not necessary to continuously apply a control voltage or the like to the valving element to maintain the valving element in the normal state. For example, if the fluid control valve is used in the abnormal state, the pressure chamber is sealed to create a pressure difference corresponding to the abnormal state, so that the abnormal state can be maintained without applying the control voltage or the like continuously to the valve.

In a preferred embodiment, the fluid control valve is a normally-open type valve in which the valve opening pressure is greater than the valve closing pressure to keep the valving element open in the normal state. The fluid control valve is provided on at least one of an entrance side or an exit side of a fluid for the fuel cell. In the abnormal state, the fluid control valve functions as a shutoff valve as it switches the valving element to the closed state when the valve closing pressure is greater than the valve opening pressure.

In this configuration, the normally-open type valve is provided on at least one side, and preferably on both sides of the entrance and the exit of the fluid for the fuel cell. Using the normally-open type valve as the shutoff valve attains more precise opening of the valve than using the normally-closed type valve. As such, the normally-open type valve is preferably used as a shutoff valve provided in the oxide gas side of the fuel cell where the valve should be kept open for an extended period of time during power generation of the fuel cell.

In a preferred embodiment, the fluid control valve has two pressure chambers including a valve opening-side pressure chamber corresponding to the valve opening pressure, and a valve closing-side pressure chamber corresponding to the valve closing pressure. In this configuration, amore reliable control process can be attained by utilizing the pressure difference, compared to using the fluid control valve having only one pressure chamber, whether the valve opening side pressure chamber or the valve closing side pressure chamber.

In a preferred embodiment, the fuel cell system further includes a three way valve for selectively connecting one of the two pressure chambers of the fluid control valve with the fluid flow path, whereby the interior pressure of the two pressure chambers is controlled by utilizing a fluid pressure transmitted via the three way valve. In a preferred embodiment, the three way valve connects one of the two pressure chambers of the fluid control valve with the fluid flow path in an uncontrolled state. In a controlled state, the three way valve connects the other pressure chamber of the two pressure chambers of the fluid control valve with the fluid flow path. As used herein, "an uncontrolled state" refers to the state where the control voltage (or the electric current) or the like need not be applied to the three-way valve, and "a controlled state" refers to the state where the control voltage (or the electric current) or the like is applied to the three-way valve.

In a preferred embodiment, of the valve opening pressure and the valve closing pressure of the fluid control valve, the pressure chamber corresponding to one valve pressure greater than the other valve pressure in the normal state is connected with the fluid flow path, so that the interior of the pressure chamber is pressurized to maintain the fluid control valve in the normal state. In a preferred embodiment, the interior of one pressure chamber of the two pressure chambers of the fluid control valve is depressurized, followed by pressurization of the interior of the other pressure chamber, to switch the fluid control valve from the normal state to the abnormal state and vice versa.

In a preferred embodiment, the fuel cell system further includes a compressor for circulating a fluid through the fluid flow path, and a depressurizing flow path for connecting the pressure chamber of the fluid control valve with the upstream side of the compressor. The pressure chamber of the fluid control valve is depressurized by utilizing the pressure from the upstream side of the compressor, which is smaller than the pressure from the downstream side of the compressor. In this configuration, the pressure chamber is depressurized using a small pressure (e.g., a negative pressure) from the upstream side of the compressor, so that the fuel cell system can have a better ability to respond to the depressurization process, compared to depressurizing the pressure chamber by, for example, releasing the interior of the pressure chamber to the ambient air.

In a preferred embodiment, the pressure chamber of the fluid control valve is connected with the fluid flow path, following the stop of the compressor for circulating the fluid through the fluid flow path, to depressurize the interior pressure of the pressure chamber of the fluid flow valve. In this configuration, a fuel cell system which does not include a depressurizing valve for depressurizing the pressure chamber of the fluid control valve can be provided.

In a preferred embodiment, the fuel cell system further includes a depressurizing valve for depressurizing the interior pressure of the fluid control valve. When an abnormal condition occurs in the depressurizing valve for the fluid control valve, the compressor is stopped and the pressure chamber of the fluid control valve is connected with the fluid flow path to depressurize the interior of the pressure chamber.

In another aspect, to achieve the object mentioned above, a fuel cell system according to a preferred embodiment of the present invention includes a fuel cell, a fluid flow path connected to the fuel cell, and a fluid control valve provided in the fluid flow path. The fluid control valve includes a valving element activated in response to a pressure difference between a valve opening pressure and a valve closing pressure. The fluid control valve is provided on at least one of an entrance side and an exit side of the fluid for the fuel cell. After the power generating operation of the fuel cell is stopped, the valving element of the fluid control valve is closed, so that the at least one of the entrance side and the exit side of the fuel cell is sealed.

In a preferred embodiment, the fluid control valve controls at least one of the valve opening pressure and the valve closing pressure by utilizing the pressure of the fluid flowing through the fluid flow path.

The present invention advantageously provides an improved technique for controlling the open/closed state of the valves used in the fuel cell system. For example, the preferred embodiments of the present invention reduce power consumption for controlling the valves. Also, the preferred embodiments of the present invention allow the system to be maintained in either the normal state or the abnormal state without the need for continuous application of the control voltage or the like. Further, the preferred embodiments of the present invention provide a better ability to respond to the depressurization of the pressure chamber of the fluid control valve. The preferred embodiments of the present invention further provide an improved fuel cell system which does not need a depressurizing valve for depressurizing the pressure chamber of the fluid control valve.

BRIEF DESCRIPTION OF THE DRAWING(S)

DETAILED DESCRIPTION OF EXAMPLE EMBODIMENTS

A preferred embodiment of the present invention will be described below with reference to the attached drawings.

Figure 1:
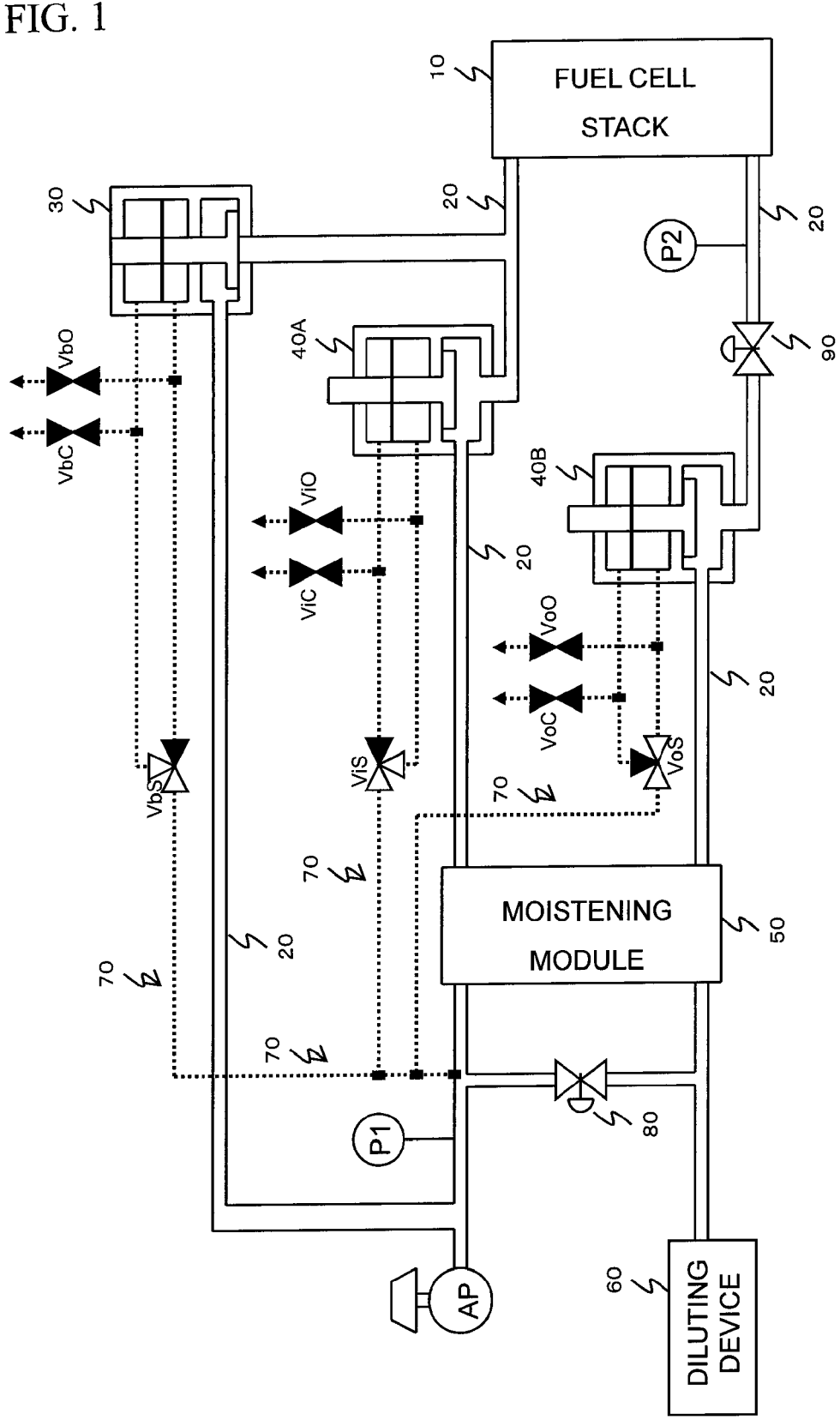
FIG. 1 shows an overall illustrative view of a fuel cell system according to the present invention.

FIG. 1 shows a preferred embodiment of a fuel cell system according to the present invention, and an overall illustrative view of the fuel cell system is shown in FIG. 1. The fuel cell system of FIG. 1 includes a fuel cell stack 10, a fluid flow path 20, and other components, in which the fluid flow path 20 has a moistening module bypass valve (a moistening M bypass valve) 30, an entrance side shutoff valve 40A, an exit side shutoff valve 40B, and so on.

Fuel cell stack 10 generates power by causing a reacting between a fuel gas such as hydrogen and an oxide gas such as oxygen. Specifically, the fuel gas and the oxide gas are fed to fuel cell stack 10, and these gases react together in multiple fuel cells (not shown) in the fuel cell stack 10 to generate electrical energy. The fuel cells are in the shape of nearly rectangular plates, and such fuel cells are stacked on one another to form fuel cell stack 10. It is noted that each fuel cell may be cylindrical.

It is noted that the fuel cell system of this embodiment may also be installed, for example, in vehicles, so that fuel cell stack 10 is used as a power source of a motor for vehicles. It will be easily understood that fuel cell system of this embodiment may be incorporated in other devices and system besides vehicles.

The fluid flow path 20 functions as a flow path to feed the reaction gases to the fuel cell stack 10. Specifically, one of two reaction gases (e.g., air used as the oxide gas) is fed into the fuel cell stack 10 through the fluid flow path 20. It also functions as a flow path to discharge the gas and water generated during the reaction from the fuel cell stack 10. It is noted that another fluid flow for feeding the other reaction gas (e.g., a hydrogen gas) is coupled to the fuel cell stack 10, although the other flow path is not shown in FIG. 1.

The moistening M bypass valve 30, entrance-side shutoff valve 40A, and exit-side shutoff valve 40B function as fluid control valves to regulate the flow of air within fluid flow path 20. Three PSVs (Pressure Switching Valves) are attached to the three valves, one PSV for each valve, via a pressure control flow path 70.

Specifically, three PSVs including VbS, VbC, and VbO are coupled to the moistening M bypass valve 30. Also, three PSVs including ViS, ViC, and ViO are coupled to the entrance-side shutoff valve 40A, and another three PSVs including VoS, VoC, VoO are coupled to the exit-side shutoff valve 40B. These PSVs are placed at the upstream side of the fluid flow path 20 via pressure control flow path 70 between, for example, an air compressor (AP) and moistening module 50. It is noted that these PSVs are controlled by a control section which is not shown.

The moistening M bypass valve 30, entrance-side shutoff valve 40A, and exit-side shutoff valve 40B are respectively controlled by corresponding PSVs. In this embodiment, the moistening M bypass valve 30, entrance-side shutoff valve 40A, and exit-side shutoff valve 40B are respectively controlled in response to the state and other conditions of the fuel cell stack 10, which will be described later.

The airflow of the fluid flow path 20 will now be described. The air flowing through fluid flow path 20 is sucked in by the air compressor (AP). The air compressor sucks air into the fluid flow path 20 from the ambient air via an air cleaner (not shown) or the like. The air expelled from the air compressor is fed to a moistening module 50, moistening M bypass valve 30, and fuel cell bypass valve 80.

The moistening module 50 adjusts the humidity of the air flowing through fluid flow path 20. Specifically, the moistening module 50 adds moisture to the air so that it has a suitable amount of humidity for, for example, the chemical reaction to be carried out in fuel cell stack 10. After adjustment of humidity, the air is fed to the fuel cell stack 10 via the entrance-side shutoff valve 40A.

Another route to feed air to the fuel cell stack 10 without passing through the moistening module 50 is also provided. Specifically, the air is fed from the air compressor to the fuel cell stack 10 via the moistening M bypass valve 30, so that the air flowing thorough this route is fed to the fuel cell stack 10 without adjusting the humidity of the air.

The air fed to the fuel cell bypass valve 80 is discharged into the ambient air via a diluting device 60, and is not fed to the fuel cell stack 10. The fuel cell bypass valve 80 is used to adjust the pressure (or discharge pressure) of the air fed to fuel cell stack 10. Specifically, the pressure of the air in fluid flow path 20 is adjusted at a pressure gauge P1 according to an opening angle of the fuel cell bypass valve 80. The discharge pressure of the air may also be adjusted in response to the flow rate of the air discharged from the air compressor (AP). Obviously, the discharge pressure may be adjusted using both the valve opening angle of the fuel cell bypass valve 80 and the air flow rate of the air compressor.

A gas (or the air after the reaction) discharged from fuel cell stack 10 is fed to an air pressure regulating valve 90. The air pressure regulating valve 90 is used to adjust the pressure (or back pressure) of the air discharged from fuel cell stack 10. Specifically, the air pressure in the fluid flow path 20 is adjusted at a pressure gauge P2 according to an opening angle of the air pressure adjusting valve 90. For example, the back pressure may be adjusted so that it becomes a target value for efficient power generation of the fuel cell stack 10.

Then, the air discharged from air pressure adjusting valve 90 flows through the exit-side shutoff valve 40B, moistening module 50, and diluting device 60, and then goes into the ambient air.

Referring to FIGS. 2-5, the moistening M bypass valve 30, entrance-side shutoff valve 40A, and exit-side shutoff valve 40B will be described in detail. First, the entrance-side shutoff valve 40A and exit-side shutoff valve 40B are described.

Figure 2:
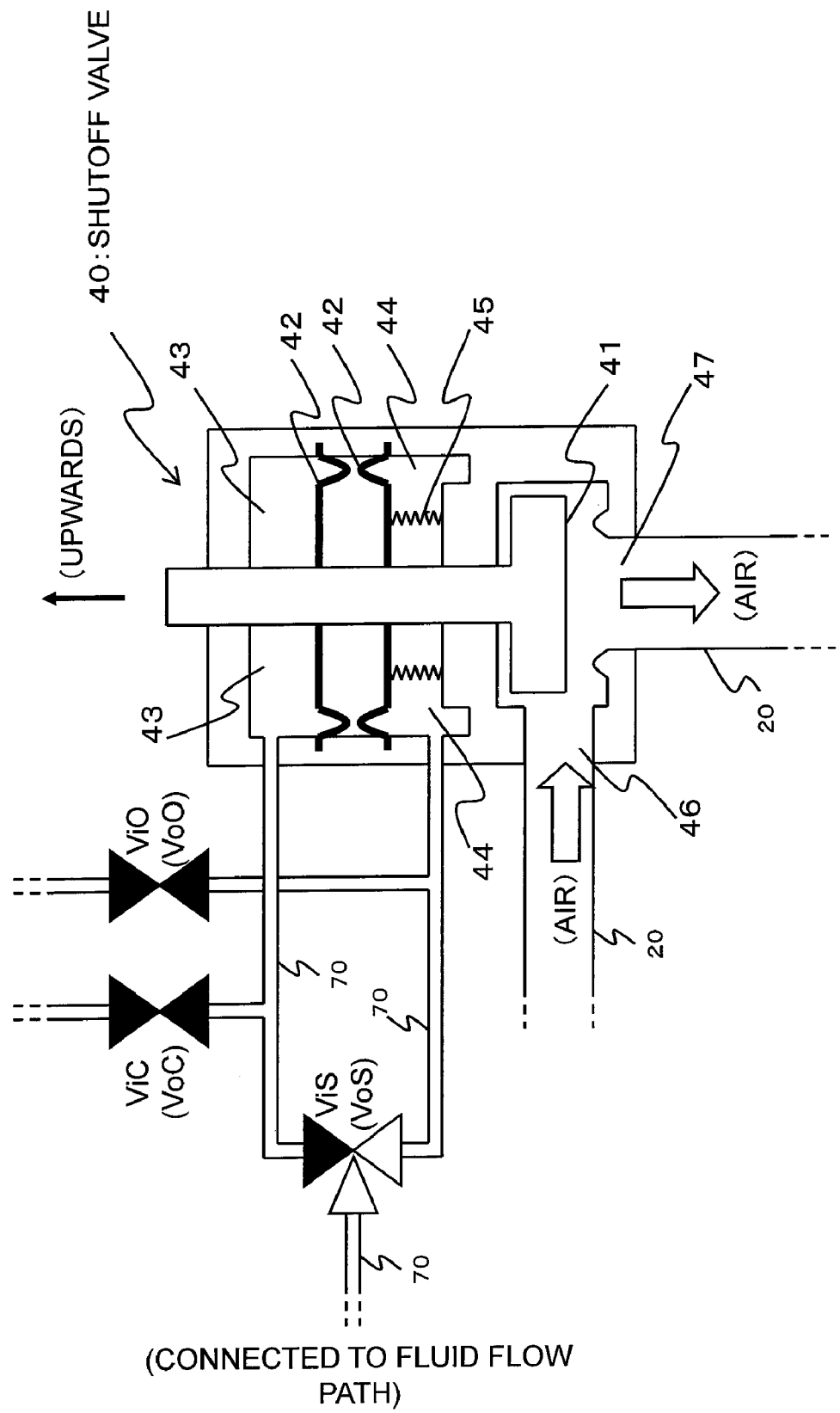
FIG. 2 shows an illustrative view of a shutoff valve to explain its configuration.

FIG. 2 shows an illustrative view of a shutoff valve 40 (entrance-side shutoff valve 40A and exit-side shutoff valve 40B) to explain the structure of the valve. The shutoff valve 40 is a normally-open type valve in which a valve opening force is greater than a valve closing force in the normal condition to keep a valving element (valve body) 41 in the open state.

The shutoff valve 40 has a diaphragm 42, and a valve closing-side pressure chamber 43 is provided on the upper face side of the diaphragm 42, while a valve opening side pressure chamber 44 is provided on the lower face-side of the diaphragm 42.

The diaphragm 42 is displaced upwards and downwards in the vertical direction of the figure in response to a pressure difference between the interior pressure of valve opening-side pressure chamber 43 and the interior pressure of valve closing-side pressure chamber 44. In FIG. 2, for example, lateral ends of the diaphragm 42 are fixed, so the middle part of the diaphragm 42 is warped upwards and downwards. Obviously, another type of diaphragm 42 in which the entire diaphragm 42 is displaced vertically may be used. As the diaphragm 42 is displaced, the valving element 41 connected to the diaphragm 42 is also displaced. As a result, the valve opening angle of shutoff valve 40 is adjusted according to the displacement of the diaphragm 42.

For example, if valving element 41 is moved upwards by the displacement of the diaphragm 42, the air is fed from the fluid flow path 20 via an entrance 46 of shutoff valve 40 and discharged to fluid flow path 20 via an exit 47 thereof. In contrast, if valving element 41 is moved downwards by the displacement of the diaphragm 42 to close the exit 47, the airflow from fluid flow path 20 flowing from the side of entrance 46 to the side of exit 47 is shut off.

Springs 45 are provided on the lower face side of the diaphragm 42 to apply an upward spring force thereto.

Alternatively, a partition which separates the interior of the pressure chamber from the exterior may be provided, so as to connect the partition that moves in response to the pressure difference between the interior and exterior of the pressure chamber with the valving element 41. In this case, the valving element 41 moves in an interlocking matter with the partition that moves in response to the pressure difference to change the opening angle of the fluid flow path 20.

Interior pressure of the valve closing-side pressure chamber 43 and valve opening-side pressure chamber 44 is controlled by the three PSVs. Specifically, if shutoff valve 40 is the entrance side shutoff valve (indicated by 40A in FIG. 1), the interior pressure of each pressure chamber is controlled by three PSVs including ViS ViC, and ViO, respectively. In contrast, if shutoff valve 40 is the exit side shutoff valve (indicated by 40B in FIG. 1), the interior pressure of each pressure chamber is controlled by three PSVs including VoS, VoC, and VoO, respectively.

ViS (or VoS) is a three way PSV and functions as a three way valve which selectively connects one of two pressure chambers including valve closing-side pressure chamber 43 and valve opening-side pressure chamber 44 to the fluid flow path 20. Specifically, ViS connects the pressure control path 70 leading to the fluid flow path 20 with either the pressure control path 70 leading to the valve closing-side pressure chamber 43, or the pressure control path 70 leading to the valve opening-side pressure chamber 44.

For example, ViS is formed by a solenoid valve which switches the open/closed state of the valve upon power-on. In the uncontrolled state where no electric current is fed (i.e., the non-conductive state), ViS selects the valve opening-side pressure chamber 44. Specifically, when ViS is in the non-conductive state, it connects the pressure control path 70 leading to the fluid flow path 20 with the pressure control path 70 leading to the valve opening-side pressure chamber 44. In contrast, in the controlled state where an electric current is fed (i.e., the conductive state), ViS selects the valve closing-side pressure chamber 43. Specifically, when ViS is in the conductive state, it connects the pressure control path 70 leading to the fluid flow path 20 with the pressure control path 70 leading to the valve closing-side pressure chamber 43.

ViC (or VoC) is a two way PSV and functions as a depressurizing valve to reduce the interior pressure of the valve closing-side pressure chamber 43. One end of ViC is connected to the pressure control path 70 leading to the valve closing-side pressure chamber 43, and the other end of ViC is open to the ambient air.

For example, ViC is formed by a solenoid valve which switches the open/closed state of the valve upon power-on. In the uncontrolled state where no electric current is fed (i.e., the non-conductive state), ViC keeps the valve closed. As a result, the flow path to bring the ambient air into the valve closing-side pressure chamber 43 is shut off when ViC is in the non-conductive state. In contrast, ViC opens the valve when it is in the controlled state where an electric current is fed to ViC (i.e., the conductive state). Thus, when ViC is in the conductive state, it establishes the path between the interior of the valve closing-side pressure chamber 43 and the ambient air.

ViO (or VoO) is a two way PSV and functions as a depressurizing valve to reduce the interior pressure of the valve opening-side pressure chamber 44. One end of ViO is connected to pressure control path 70 leading to the valve opening-side pressure chamber 44, and the other end of ViO is open to the ambient air.

For example, ViO is formed by a solenoid valve which switches the open/closed state of the valve upon power-on. In the uncontrolled state where no electric current is fed (i.e., the non-conductive state), ViO keeps the valve closed. As a result, the flow path to bring the ambient air into the valve opening-side pressure chamber 44 is shut off when ViO is in the non-conductive state. In contrast, ViO opens the valve when it is in the controlled state where an electric current is fed to ViO (i.e., the conductive state). Thus, when ViC is in the conductive state, it establishes the path between the interior of the valve closing-side pressure chamber 44 and the ambient air.

It is noted that in the figures that are used in connection with the explanation of this embodiment, among a plurality of triangles representing ViS (VoS), ViC (VoC), and ViO (VoS), smeared triangles indicate that the corresponding pressure control path 70 is closed, while blank ones indicate that the same path is opened.

For example, the smeared triangles shown in FIG. 2 indicate that ViS (or VoS) closes pressure control flow path 70 leading to valve closing-side pressure chamber 43, while pressure control flow path 70 leading to fluid flow path 20 is connected with pressure control flow path 70 leading to the valve opening-side pressure control chamber 44 (the non-conductive state). Also, in FIG. 2, the triangles representing ViC (or VoC) are smeared, indicating that ViC (or VoC) is closed (or in the non-conductive state). The triangles representing ViO (or VoO) are also smeared in FIG. 2, indicating that ViO (or VoO) is also closed (or in the non-conductive state).

Figure 3:
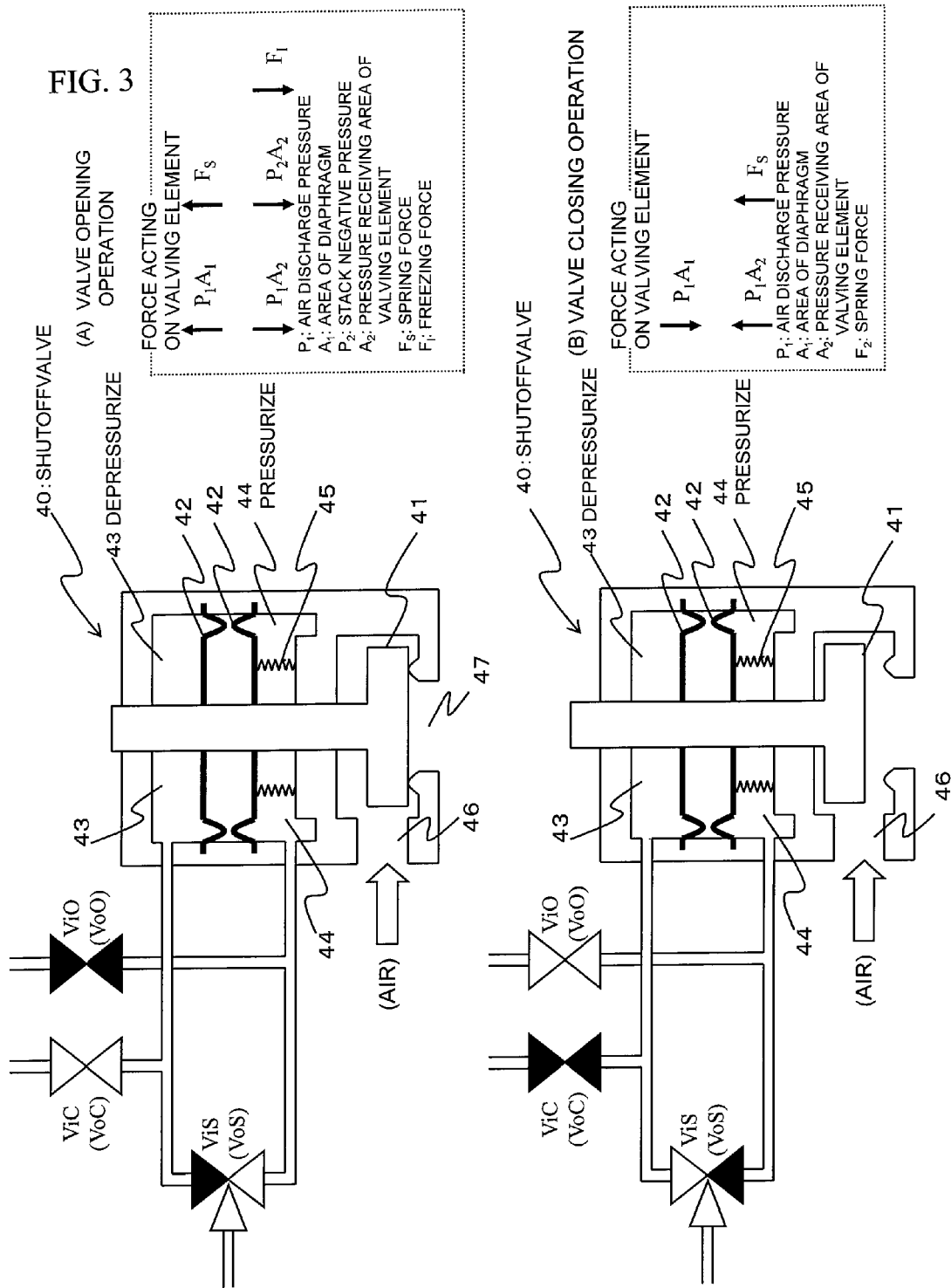
FIG. 3 shows an illustrative view of a shutoff valve to explain its opening and closing operations.

FIG. 3 shows an illustrative view of the shutoff valve 40 (entrance side shutoff valve 40A or exit side shutoff valve 40B of FIG. 1) to explain the opening and closing operations of the valve.

Referring to FIG. 3(A), the opening operation of the shutoff valve 40 is explained. Specifically, a process to open the valve by upwardly moving the valving element 41 that is in the descended and closed state is explained.

To open shutoff valve 40, ViS (or VoS) is switched to the non-conductive state, so that the valve opening-side pressure chamber 44 is connected to the fluid flow path (indicated by 20 in FIG. 1). Also, ViO (or VoO) is switched to the non-conductive state, so that the flow path between the valve opening-side pressure chamber 44 and the ambient air is shut off. Then, ViC (or VoC) is switched to the conductive state to establish the flow path between the closing-side pressure chamber 43 and the ambient air, so that the valve closing-side pressure chamber 43 is depressurized.

In this state, force is applied to the valving element 41 of shutoff valve 40. Assuming that $P_1$ is the discharge pressure of the air compressor (AP) and $A_1$ is the area of the diaphragm 42, as the valve opening-side pressure chamber 44 is connected to the flow path (indicated by 20 in FIG. 1), a pressure is applied to the valve-opening side pressure chamber 44 to make the interior pressure $P_1$, thereby creating an upward force $P_1 A_1$ acting on the valving element 41 via the diaphragm 42.

In addition, as the incoming air (with pressure $P_1$) from the entrance 46 of shutoff valve 40 applies a direct force to the valving element 41, a downward force $P_1 A_2$ acts on the valving element 41, where $A_2$ is the pressure receiving area of the valving element 41. Further, the negative pressure in the fuel cell stack (indicated by 10 in FIG. 1), $P_2$, applies a force to the valving element 41 via the exit 47 of shutoff valve 40, to create a downward force $P_2 A_2$ acting on the valving element 41.

Also, springs 45 create an upward force $F_S$ and apply it to valving element 41 via the diaphragm 42. If a force to fix the valving element 41 at or near exit 47 by freezing or other reasons is considered, a downward freezing force $F_I$ acts on the valving element 41.

Thus, to upwardly move the valving element 41 to open the valve, the forces acting on the valving element 41 in the vertical direction should satisfy the relationship:

$$P_1A_1+F_S>P_1A_2+P_2A_2+F_I$$

For example, the discharge pressure of air, $P_1$, may be adjusted to satisfy this relationship.

Referring to FIG. 3(B), the closing operation of the shutoff valve 40 is explained. Specifically, the operation to close the valve by moving the valving element 41 that is in raised and open state downwards will be explained.

To close shutoff valve 40, ViS (or VoS) is switched to the conductive state, so that valve closing-side pressure chamber 44 is connected to the fluid flow path (indicated by 20 in FIG. 1). Also, ViC (or VoC) is switched to the non-conductive state, so that the flow path between valve the closing-side pressure chamber 44 and the ambient air is shut off. Then, ViO (or VoO) is switched to the conductive state to establish the flow path between the valve opening-side pressure chamber 44 and the ambient air, so that the valve opening-side pressure chamber 43 is depressurized.

In this state, force is applied to the valving element 41 of the shutoff valve 40. Assuming that $P_1$ is the discharge pressure of the air compressor (AP) and $A_1$ is the area of the diaphragm 42, the valve-closing side pressure chamber 43 is pressurized to create the interior pressure $P_1$, because the valve closing-side pressure chamber 44 is connected to the flow path (indicated by 20 in FIG. 1). As a result, a downward force $P_1A_1$ acts on the valving element 41 via the diaphragm 42.

In addition, because the air (with pressure $P_1$) comes in from the entrance 46 of shutoff valve 40 to apply a direct force on the valving element 41, if $A_2$ is the pressure receiving area of valving element 41, an upward force $P_1A_2$ acts on the valving element 41. Further, springs 45 create an upward force $F_S$ and apply it to the valving element 41 via the diaphragm 42.

Thus, to move the valving element 41 upwards to open the valve, the relationship of forces acting on the valving element 41 in the vertical direction should satisfy:

$$P_1A_1>P_1A_2+F_S$$

For example, the discharge pressure of air, $P_1$, or the like is controlled to satisfy this relationship.

It is noted that the shutoff valve 40 utilizing two pressure chambers has been described above in connection with FIGS. 2 and 3, but only a single pressure chamber, for example, a valve closing-side pressure chamber 43, may be used. In this case, the valve closing-side pressure chamber 43 is pressurized to close the shutoff valve 40, so as to satisfy the relationship of forces to move valving element 41 downwards. In contrast, the valve closing-side pressure chamber 43 is depressurized to open the shutoff valve 40, so as to satisfy the relationship of forces to move the valving element 41 upwards by using the spring force of springs 45 and the pressure of incoming air from the entrance 46.

Figure 4:
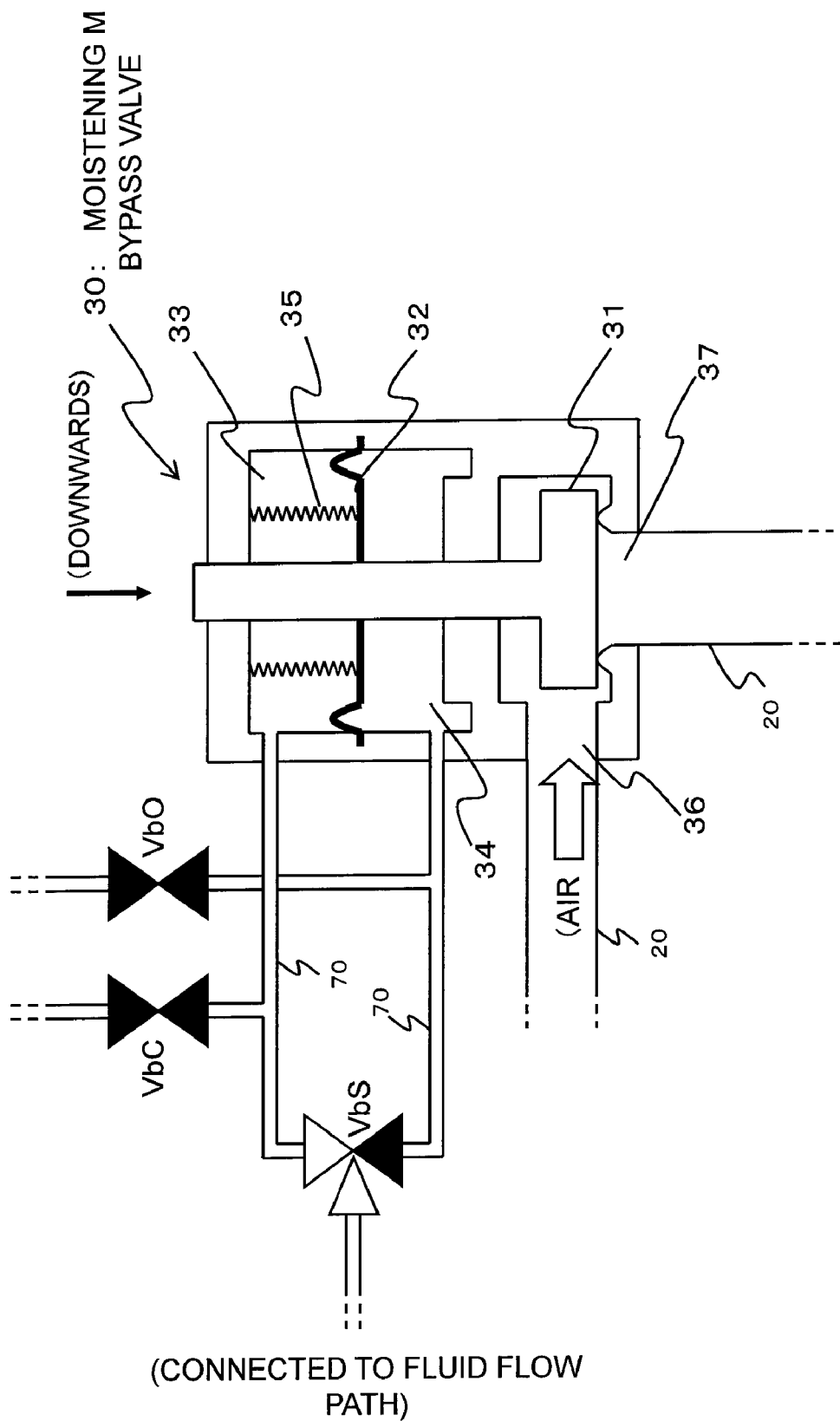
FIG. 4 shows an illustrative view of a moistening M bypass valve to explain its configuration.
Figure 5:
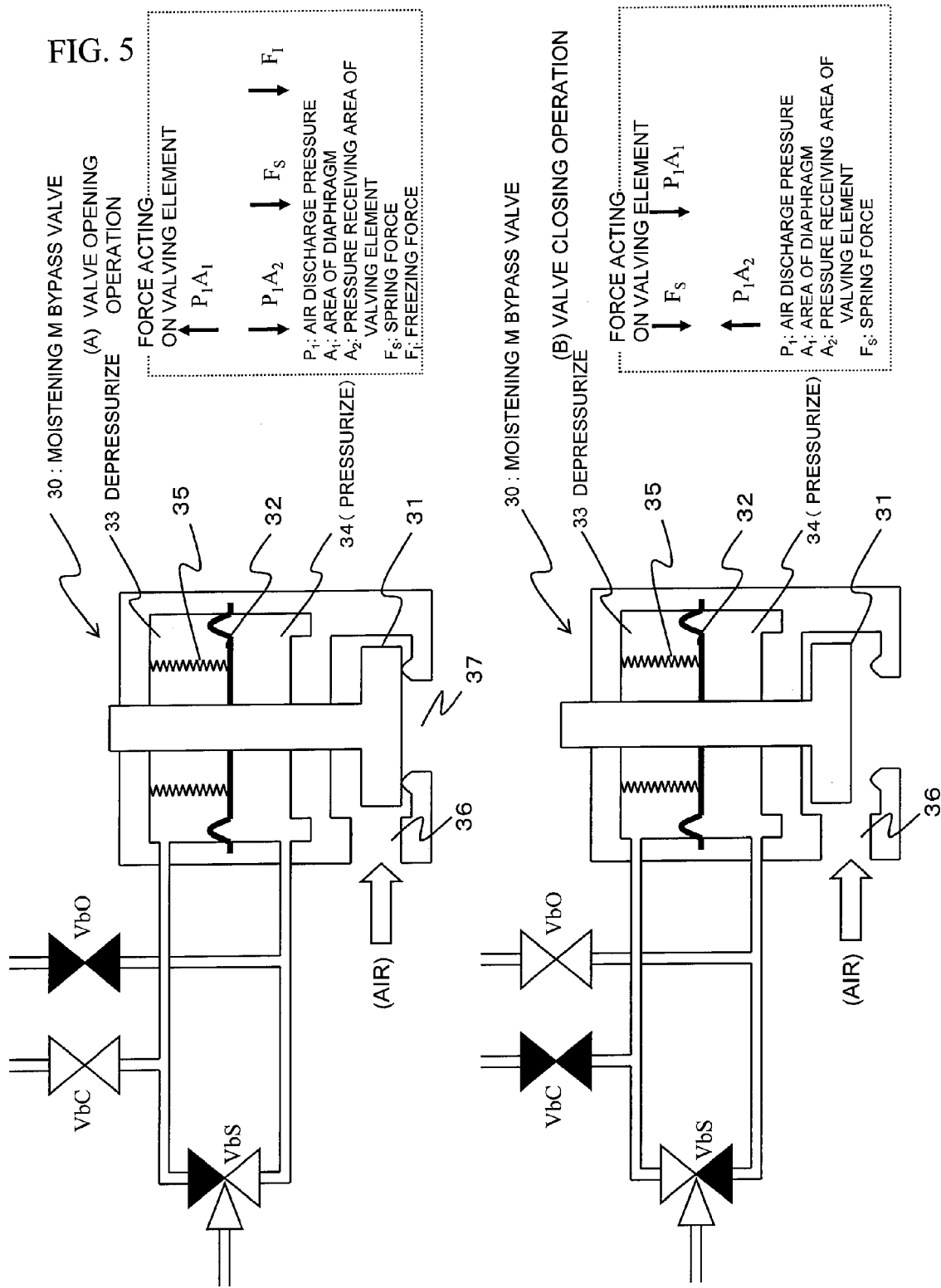
FIG. 5 shows an illustrative view of a moistening M bypass valve to explain its opening and closing operations.

Referring to FIGS. 4 and 5, the moistening M bypass valve 30 will be explained. FIG. 4 shows an illustrative view of the moistening M bypass valve 30 to explain the structure of the valve. The moistening M bypass valve 30 is a normally-closed valve in which the valve closing force is larger than the valve opening force in the normal state, to keep valving element 31 in the closed state.

The moistening M bypass valve 30 includes a diaphragm 32, in which a valve closing side pressure chamber 33 is provided on the upper face side of the diaphragm 32, and a valve opening-side pressure chamber 34 is provided on the lower face side thereof.

The diaphragm 32 is displaced upwards and downwards in the vertical direction of the figure in response to a pressure difference between the interior pressure of the valve opening-side pressure chamber 33 and the interior pressure of the valve closing-side pressure chamber 34. In FIG. 4, for example, lateral ends of the diaphragm 32 are fixed, so the middle part of the diaphragm 32 is warped upwards and downwards. Obviously, another type of diaphragm 32, in which the entire diaphragm 32 is displaced vertically, may be used. As the diaphragm 32 is displaced, the valving element 31 connected to the diaphragm 32 is also displaced. As a result, the valve opening angle of the moistening M bypass valve 30 is adjusted according to the displacement of the diaphragm 32.

For example, if the valving element 31 is moved upwards by the displacement of the diaphragm 32, air fed from the fluid flow path 20 via an entrance 36 of the moistening M bypass valve 30 and is discharged to the fluid flow path 20 via an exit 37 thereof. In contrast, if the valving element 31 is moved downwards by the displacement of the diaphragm 32 to close the exit 37, airflow from the fluid flow path 20 flowing from the side of the entrance 36 to the side of the exit 37 is shut off.

Springs 35 are provided on the lower side of the diaphragm 32 to apply an upward spring force thereto.

Interior pressure of the valve closing-side pressure chamber 33 and the valve opening-side pressure chamber 34 is controlled by the three PSVs. Specifically, the interior pressure of each pressure chamber is controlled by VbS, VbC, and VbO, respectively.

VbS is a three way PSV and functions as a three way valve which selectively connects one of two pressure chambers, including valve closing-side pressure chamber 33 and valve opening-side pressure chamber 34, to the fluid flow path 20. Specifically, VbS connects the pressure control path 70 leading to the fluid flow path 20 with either the pressure control path 70 leading to the valve closing-side pressure chamber 33, or the pressure control path 70 leading to the valve opening-side pressure chamber 34.

For example, VbS is formed by a solenoid valve which switches the open/closed state of the valve upon power-on. In the uncontrolled state where no electric current is fed (i.e., the non-conductive state), VbS selects the valve closing-side pressure chamber 33. Specifically, when VbS is in the non-conductive state, it connects the pressure control path 70 leading to the fluid flow path 20 with the pressure control path 70 leading to the valve closing-side pressure chamber 33. In contrast, in the controlled state where an electric current is fed (i.e., the conductive state), VbS selects the valve opening-side pressure chamber 34. Specifically, when VbS is in the conductive state, it connects the pressure control path 70 leading to fluid flow path 20 with the pressure control path 70 leading to the valve opening-side pressure chamber 34.

VbC is a two way PSV and functions as a depressurizing valve to reduce the interior pressure of the valve closing-side pressure chamber 33. One end of ViC is connected to the pressure control path 70 leading to the valve closing-side pressure chamber 33, and the other end of ViC is open to the ambient air.

For example, VbO is formed by a solenoid valve which switches the open/closed state of the valve upon power-on. In the uncontrolled state where no electric current is fed (i.e., the non-conductive state), VbC keeps the valve closed. As a result, the flow path to bring the ambient air into the valve closing-side pressure chamber 33 is shut off when VbC is in the non-conductive state. In contrast, VbC opens the valve when it is in the controlled state where an electric current is fed to VbC (i.e., the conductive state). Thus, when ViC is in the conductive state, it establishes the path between the interior of the valve closing-side pressure chamber 33 and the ambient air.

VbO is a two way PSV and functions as a depressurizing valve to reduce the interior pressure of the valve opening-side pressure chamber 34. One end of VbO is connected to the pressure control path 70 leading to the valve opening-side pressure chamber 34, and the other end of VbO is open to the ambient air.

For example, VbO is formed by a solenoid valve which switches the open/closed state of the valve upon power-on. In the uncontrolled state where no electric current is fed (i.e., the non-conductive state), VbO keeps the valve closed. As a result, the flow path to bring the ambient air into the valve opening-side pressure chamber 34 is shut off when VbO is in the non-conductive state. In contrast, VbO opens the valve when it is in the controlled state where an electric current is fed to VbO (i.e., the conductive state). Thus, when ViC is in the conductive state, it establishes the path between the interior of the valve closing-side pressure chamber 33 and the ambient air.

It is noted that in the figures that are used in connection with the explanation of this embodiment, among a plurality of triangles representing VbS, VbC, and VbO, smeared triangles indicate that the pressure control path 70 is closed, while unsmeared triangles indicate that the path is opened.

For example, smeared triangles shown in FIG. 4 indicate that VbS closes pressure control flow path 70 leading to the valve opening-side pressure chamber 34, while the pressure control flow path 70 leading to fluid flow path 20 is connected with pressure control flow path 70 leading to the valve closing-side pressure control chamber 33 (i.e., the non-conductive state). Also, in FIG. 4, the triangle representing VbC is smeared, indicating that VbC is closed (or in the non-conductive state). The triangle representing VbO is also smeared in FIG. 4, indicating that VbO is also closed (or in the non-conductive state).

FIG. 5 shows an illustrative view of the moistening M bypass valve 30 to explain the opening and closing operations. Referring to FIG. 5(A), the operation to open the moistening M bypass valve 30 will be explained. Specifically, a process to open the valve by upwardly moving the valving element 31 that is in the lowered and closed state is explained.

To open the moistening M bypass valve 30, VbS is switched to the conductive state, so that the valve opening-side pressure chamber 34 is connected to the fluid flow path (indicated by 20 in FIG. 1). Also, VbO is switched to the non-conductive state, so that the flow path between the valve opening-side pressure chamber 34 and the ambient air is shut off. Further, VbC is switched to the conductive state to establish the flow path between the valve closing-side pressure chamber 33 and the ambient air, so that the valve closing-side pressure chamber 33 is depressurized.

In this state, force is applied to the valving element 31 of the moistening M bypass valve 30. Assuming that $P_1$ is the discharge pressure of the air compressor (AP) and $A_1$ is the area of the diaphragm 32, as the valve opening-side pressure chamber 34 is connected to the flow path (indicated by 20 in FIG. 1), a pressure is applied to the valve-opening side pressure chamber 34 to make the interior pressure $P_1$, thereby creating an upward force $P_1A_1$ acting on the valving element 31 via diaphragm 32.

In addition, as the incoming air (with pressure $P_1$) from the entrance 36 of the moistening M bypass valve 30 applies a direct force to the valving element 31, a downward force $P_1A_2$ acts on the valving element 31, where $A_2$ is the pressure receiving area of the valving element 31. Further, springs 35 create a downward force $F_S$ and apply it to the valving element 31 via the diaphragm 32. If a force to fix the valving element 31 at or near the exit 37 due to freezing or any other reason is considered, a downward freezing force $F_I$ acts on the valving element 31.

Thus, to upwardly move the valving element 31 to open the valve, the forces acting on the valving element 31 in the vertical direction should satisfy the relationship:

$$P_1A_1 > P_1A_2 + F_S + F_I$$

For example, the discharge pressure of air, $P_1$, may be adjusted to satisfy this relationship.

Referring to FIG. 5(B), the operation to close the moistening M bypass valve 30 will be explained. Specifically, a process to open the valve by downwardly moving the valving element 31 that is in the raised and open state is explained.

To close the moistening M bypass valve 30, VbS is switched to the non-conductive state, so that the valve closing-side pressure chamber 33 is connected to the fluid flow path (indicated by 20 in FIG. 1). Also, VbC is switched to the non-conductive state, so that the flow path between the valve closing-side pressure chamber 33 and the ambient air is shut off. Further, VbO is switched to the conductive state to establish the flow path between the valve opening-side pressure chamber 34 and the ambient air, so that the valve opening-side pressure chamber 34 is depressurized.

In this state, force is applied to the valving element 31 of the moistening M bypass valve 30. Assuming that $P_1$ is the discharge pressure of the air compressor (AP) and $A_1$ is the area of diaphragm 32, as the valve closing-side pressure chamber 33 is connected to the flow path (indicated by 20 in FIG. 1), a pressure is applied to the valve-closing side pressure chamber 33 to make the interior pressure $P_1$, thereby creating a downward force $P_1A_1$ acting on the valving element 31 via the diaphragm 32.

In addition, as the incoming air (with pressure $P_1$) from the entrance 36 of the moistening M bypass valve 30 applies a direct force on the valving element 31, a downward force $P_1A_2$ acts on the valving element 31, where $A_2$ is the pressure receiving area of the valving element 31. Further, springs 35 create a downward force $F_S$ and apply it to valving element 31 via the diaphragm 32.

Thus, to downwardly move the valving element 31 to close the valve, the forces acting on the valving element 31 in the vertical direction should satisfy the relationship:

$$F_S + P_1A_1 > P_1A_2$$

For example, the discharge pressure of air, $P_1$, may be adjusted to satisfy this relationship.

It is noted that the moistening M bypass valve 30 utilizing two pressure chambers has been described above in connection with FIGS. 4 and 5, but only valve opening-side pressure chamber 34, for example, may be used. In this case, the valve opening-side pressure chamber 34 is pressurized to open the moistening M bypass valve 30, so as to satisfy the relationship of forces to move the valving element 31 upwards. In contrast, the valve opening-side pressure chamber 34 is depressurized to close the moistening M bypass valve 30, so as to satisfy the relationship of force to move the valving element 31 downwards by using the spring force of the springs 45.

In the above-described embodiment, the moistening M bypass valve 30, entrance-side shutoff valve 40A, and exit-side shutoff valve 40B are controlled according to the conditions and other factors of the fuel cell stack 10. Referring to FIGS. 6-12, a process to control each valve according to the conditions and other factors of the fuel cell stack 10 will be explained. It is noted that in FIGS. 6-12, the airflow of the fluid flow path 20 and other stuff are superimposed on the overall view of fuel cell system of FIG. 1, so those parts that have already been explained in connection with FIG. 1 will not be repeated.

Figure 6:
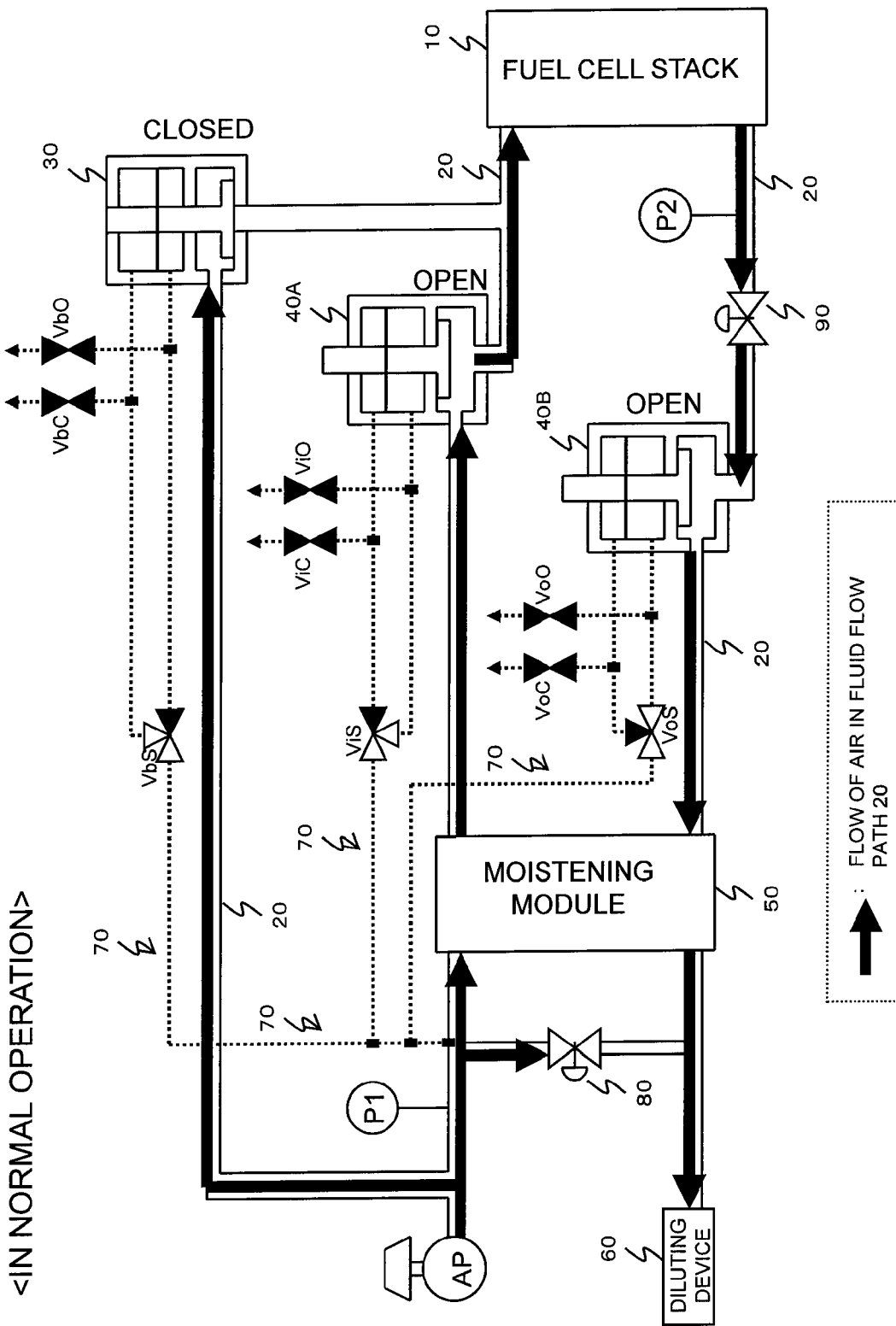
FIG. 6 shows an illustrative view of a fuel cell system to explain how it is operated in a normal operation.

FIG. 6 is an illustrative view of the fuel cell system of FIG. 1 to explain how it is operated during the normal operation. In the normal operation, the fuel cell stack 10 of the fuel cell system generates power. Specifically, the moistened air is fed to the fuel cell stack 10, and is then discharged from the fuel cell stack 10 after the reaction.

In the normal operation, the moistening M bypass valve 30 is closed, and both the entrance-side and exit-side shutoff valves 40A, B, are opened. The air compressor (AP) is in operation, so that the air discharged from the air compressor is fed to the moistening module 50, moistening M bypass valve 30, and fuel cell bypass valve 80.

The air fed from the air compressor to the moistening module 50 is moistened and fed to fuel cell stack 10 via the entrance-side shutoff valve 40A that is in the open state. The air fed from the air compressor to the moistening M bypass valve 30 is shut off by the valve, as it is closed. Also, the fuel cell bypass valve 80 is closed to shut off the airflow.

After the reaction, the air discharged from fuel cell stack 10 is released into the ambient air after passing through air pressure control valve 90 that controls the back pressure, the entrance-side shutoff valve 40B that is in the open state, the moistening module 50, and the diluting device 60.

In the normal operation, ViS, ViC, and ViO that control the entrance-side shutoff valve 40A are in the non-conductive state. Specifically, ViS has selected the valve opening-side pressure chamber (indicated by 44 in FIG. 2), and ViC and ViO are closed. In this state, the interior of the valve opening-side pressure chamber of the entrance-side shutoff valve 40A is pressurized by the discharge pressure of the air exhausted from the air compressor, so that force is applied to the valving element (indicated by 41 in FIG. 2) in the direction to open the valve. Also, the springs (indicated by 45 in FIG. 2) provided in the entrance-side shutoff valve 40A apply force to the valving element in the direction to open the valve. Further, the incoming air from the entrance (indicated by 46 in FIG. 2) of the entrance-side shutoff valve 40A applies force to the valving element in the direction to open the valve. As a result, the open state, or the normal condition, of the entrance-side shutoff valve 40A can be maintained, even if ViS, ViC, and ViO are all in the non-conductive state.

In addition, in the normal operation, VoS, VoC, and VoO that control the exit-side shutoff valve 40B are also in the non-conductive state. Similarly to the case of the entrance-side shutoff valve 40A, the closed state, or the normal condition, of the exit-side shutoff valve 40B can be maintained, even if VoS, VoC, and VoO are all in the non-conductive state.

Further, in the normal operation, VbS, VbC, and VbO that control the moistening M bypass valve 30 are also in the non-conductive state. Specifically, VbS has selected the valve closing-side pressure chamber (indicated by 33 in FIG. 4), and VbC and VbO are closed. In this state, the interior of the valve closing-side pressure chamber of moistening M bypass valve 30 is pressurized by the discharge pressure of the air exhausted from the air compressor, so that force is applied to the valving element (indicated by 31 in FIG. 4) in the direction to close the valve. Also, the springs (indicated by 35 in FIG. 4) provided in the entrance-side shutoff valve 40A apply force to the valving element in the direction to close the valve. Further, the incoming air from the entrance (indicated by 36 in FIG. 4) of the moistening M bypass valve 30 applies force to the valving element in the direction to close the valve. As a result, the open state, or the normal condition, of the moistening M bypass valve 30 can be maintained, even if VbS, VbC, and VbO are all in the non-conductive state.

Figure 7:
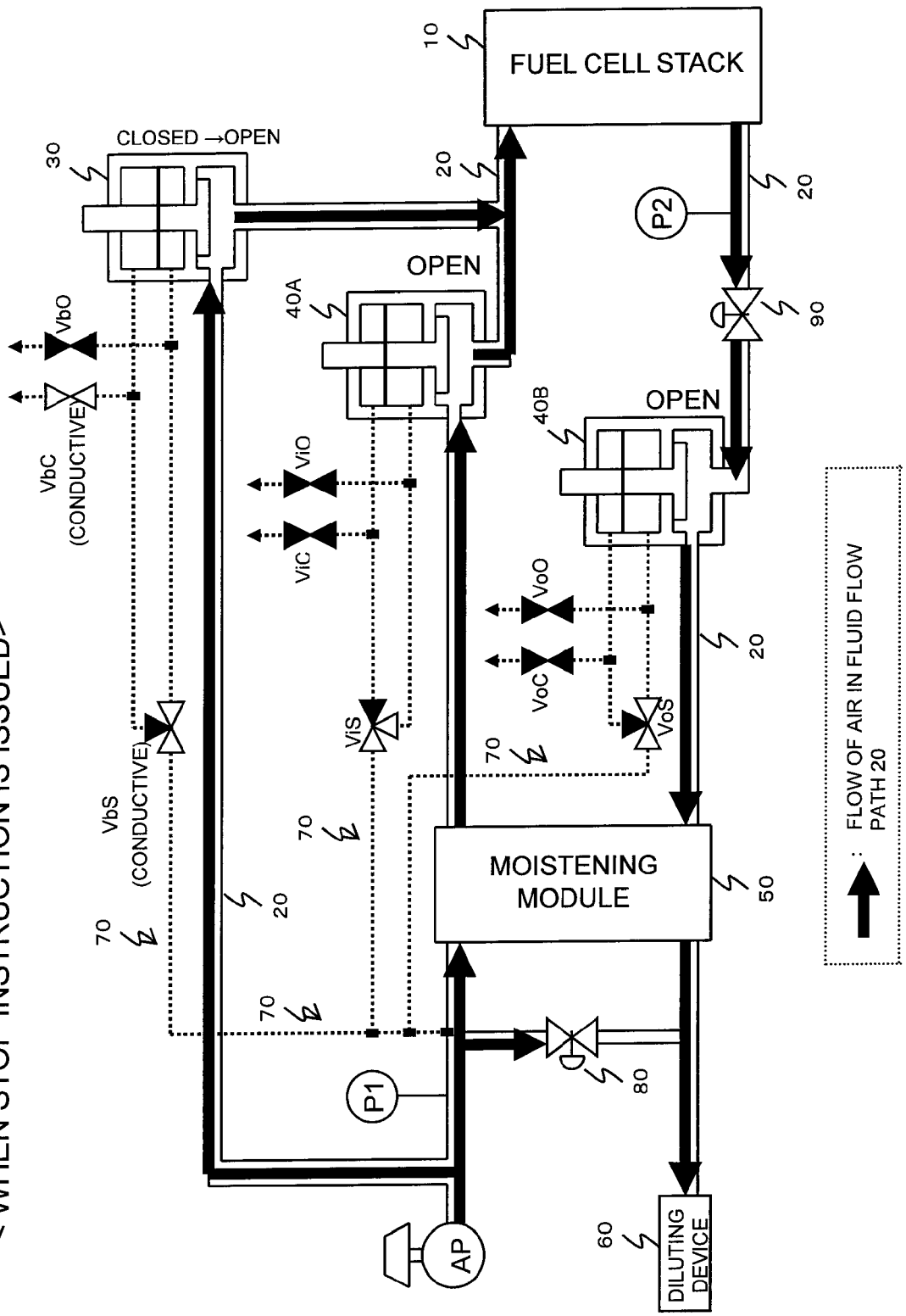
FIG. 7 shows an illustrative view of a fuel cell system to explain how it is operated when an instruction to stop operation is issued.

FIG. 7 shows an illustrative view of the fuel cell system of FIG. 1 to explain how it is operated when an instruction to stop operation is issued. The illustrated state is enabled by operation by users, for example, to stop operation of the fuel cell system.

When the instruction to stop operation is issued, the control of moistening M bypass valve 30 is switched to the open state from the closed state. The process to open the moistening M bypass valve 30 has been described above (see FIG. 5). Specifically, an electric current is fed to VbS, so that the valve opening-side pressure chamber (indicated by 34 in FIG. 5) is connected with the fluid flow path 20. In contrast, VbO is in the non-conductive state, so that the flow path between the valve opening-side pressure chamber and the ambient air is shut off. Also, an electric current is fed to VbC, so that the valve closing-side pressure chamber (indicated by 33 in FIG. 5) is depressurized. As a result, the moistening M bypass valve 30 is opened. When the valve is opened, the air discharged from the air compressor is fed to the fuel cell stack 10 via the moistening M bypass valve 30.

When the stop instruction is issued, both the entrance and exit-side shutoff valves 40A, B are still kept open, as in the normal operation (see FIG. 6). ViS, ViC, and ViO that control the entrance-side shutoff valve 40A are in the non-conductive state. Also, VoS, VoC, and VoO that control the exit-side shutoff valve 40B are in the non-conductive state.

The air fed from the air compressor to the moistening module 50 is moistened and is fed to the fuel cell stack 10 via entrance-side shutoff valve 40A that is in the open state. The fuel cell bypass valve 80 is closed to shut off the airflow.

After the reaction, the air discharged from fuel cell stack 10 is released into the ambient air after passing through the air pressure control valve 90 that controls the back pressure, the entrance-side shutoff valve 40B that is in the open state, the moistening module 50, and the diluting device 60.

Figure 8:
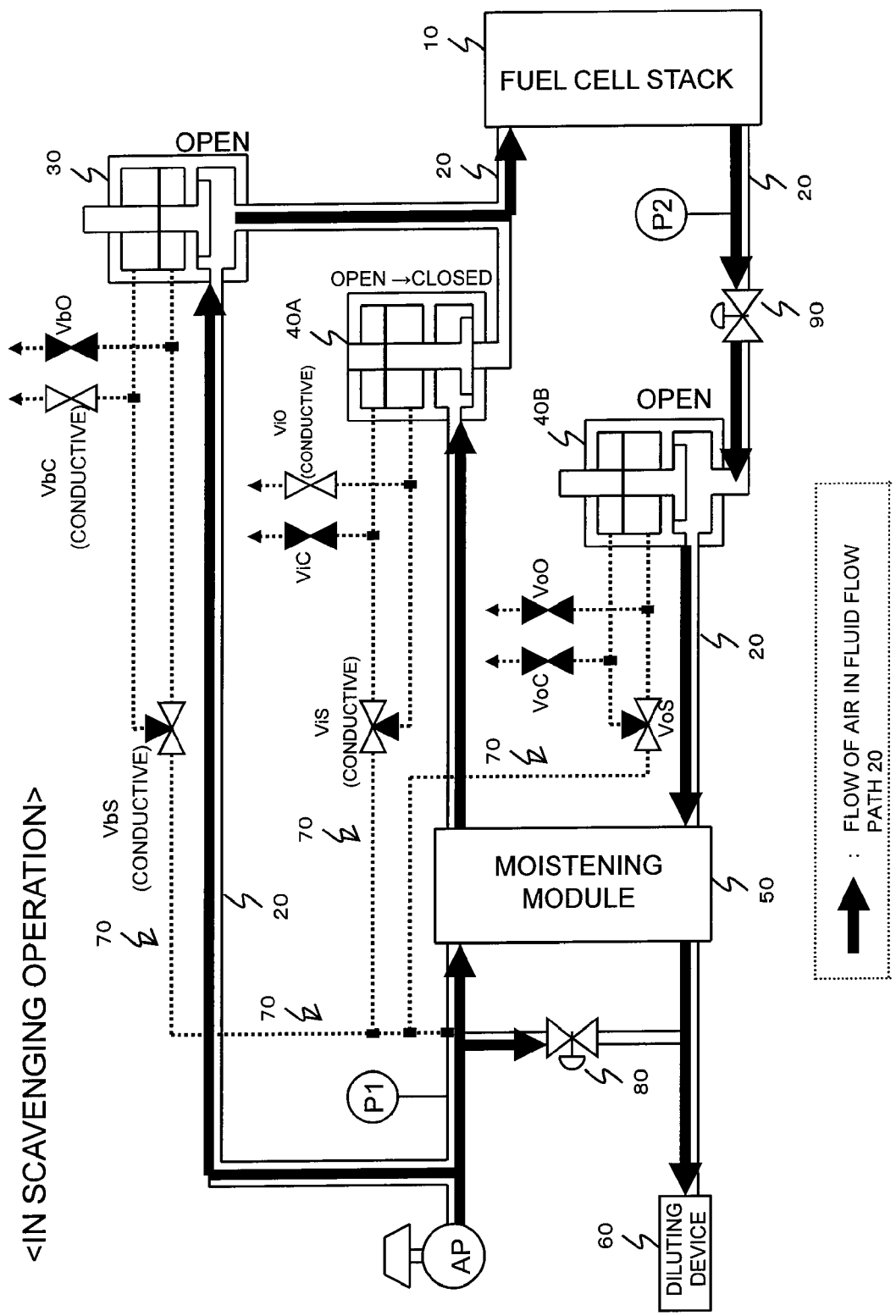
FIG. 8 shows an illustrative view of a fuel cell system to explain how it is operated in a scavenging operation.

FIG. 8 shows an illustrative view of a fuel cell system to explain how it is operated in a scavenging operation. The scavenging operation is executed, for example, to discharge water generated in fuel cell stack 10. For example, the scavenging operation is carried out within a period of time from after the instruction to stop operation is issued (see FIG. 7) until the operation of the fuel cell system is actually stopped.

In the scavenging operation, the control of the entrance-side shutoff valve 40A is switched to the closed state from the open state. The process to close the entrance-side shutoff valve 40A has been described above (see FIG. 3). Specifically, the electric current is fed to ViS, so that the valve closing-side pressure chamber (indicated by 43 in FIG. 3) is connected with the fluid flow path 20. ViC is in the non-conductive state, so that the flow path between the valve closing-side pressure chamber and the ambient air is shut off. Also, the electric current is fed to ViO, so that the valve opening-side pressure chamber (indicated by 44 in FIG. 3) is depressurized. In this state, if the entrance-side shutoff valve 40A is closed, the airflow to the fuel cell stack 10 via the entrance-side shutoff valve 40A is shut off.

In the scavenging operation, the moistening M bypass valve 30 is in the open state, as in the case of the instruction to stop operation being issued (see FIG. 7). VbS and VbC that control moistening M bypass valve 30 are in the conductive state, and VoO is in the non-conductive state. Because the moistening M bypass valve 30 is open, the air discharged from the air compressor is fed to fuel cell stack 10 via the moistening M bypass valve 30.

In addition, exit-side shutoff valve 40B is also in the open state during the scavenging operation, as in the case of the instruction to stop operation being issued (see FIG. 7). VoS, VoC, and VoO that control the exit-side shutoff valve 40B are all in the non-conductive state. Because the exit-side shutoff valve 40B is open, the air discharged from the fuel cell stack 10 is released into the ambient air after passing through the air pressure control valve 90 that controls the back pressure, the entrance-side shutoff valve 40B that is in the open state, the moistening module 50, and the diluting device 60.

Further, in the scavenging operation, it is preferred that the air pressure control valve 90 be fully open to efficiently discharge generated water or the like from the fuel cell stack 10. The fuel cell bypass valve 80 is closed to shut off the flow of air.

Figure 9:
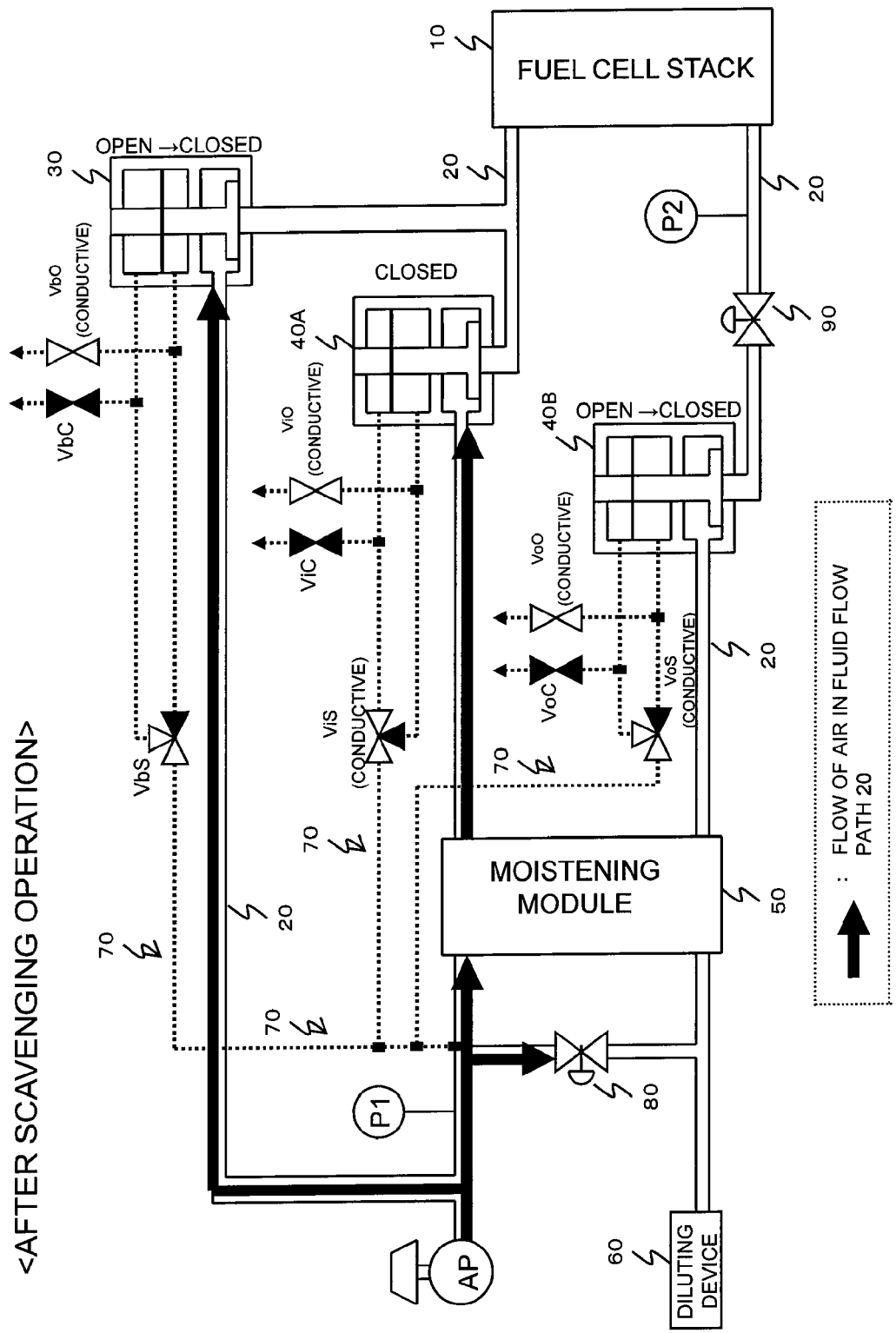
FIG. 9 shows an illustrative view of a fuel cell system to explain how it is operated after a scavenging operation is finished.

FIG. 9 is an illustrative view of the fuel cell system to explain how it is operated after the scavenging operation is finished, and the figure shows the fuel cell system immediately after the scavenging operation.

After scavenging, control of the moistening M bypass valve 30 is switched from the open state to the closed state. The process to close the moistening M bypass valve 30 has been described above (see FIG. 5). Specifically, VbS is made non-conductive, so that the valve closing-side pressure chamber (indicated by 33 in FIG. 5) is connected with the fluid flow path 20. Also, VbC is made non-conductive, so that the flow path between the valve closing-side pressure chamber and the ambient air is shut off. VbO is made conductive, so that the valve opening-side pressure chamber (indicated by 34 in FIG. 5) is depressurized. As a result, when the moistening M bypass valve 30 is closed, airflow to the fuel cell stack 10 via the moistening M bypass valve 30 is shut off.

After scavenging, the control of output shutoff valve 40B is switched from the open state to the closed state. The process to close the exit-side shutoff valve 40B has been described above (see FIG. 3). Specifically, VoS is made conductive, so that valve closing-side pressure chamber (indicated by 43 in FIG. 3) is connected with the fluid flow path 20. VoC is made non-conductive, so that the flow path between the valve closing-side pressure chamber and the ambient air is shut off. Also, VoO is made conductive, so that the valve opening-side pressure chamber (indicated by 44 in FIG. 3) is depressurized.

In addition, the entrance-side shutoff valve 40A is still closed after scavenging, as it is during the scavenging operation. ViS and ViO that control the entrance-side shutoff valve 40A are in the conductive state, and ViC is in the non-conductive state. Because the entrance-side shutoff valve 40A is closed, airflow to the fuel cell stack 10 via the entrance-side shutoff valve 40A is shut off.

Further, the air compressor (AP) is in operation after scavenging, so that the discharge pressure of the air exhausted from the air compressor applies pressure on the valve closing-side pressure chambers of the moistening M bypass valve 30, entrance-side shutoff valve 40A, and exit-side shutoff valve 40B. The fuel cell bypass valve 80 is closed, so that the airflow is shut off.

Figure 10:
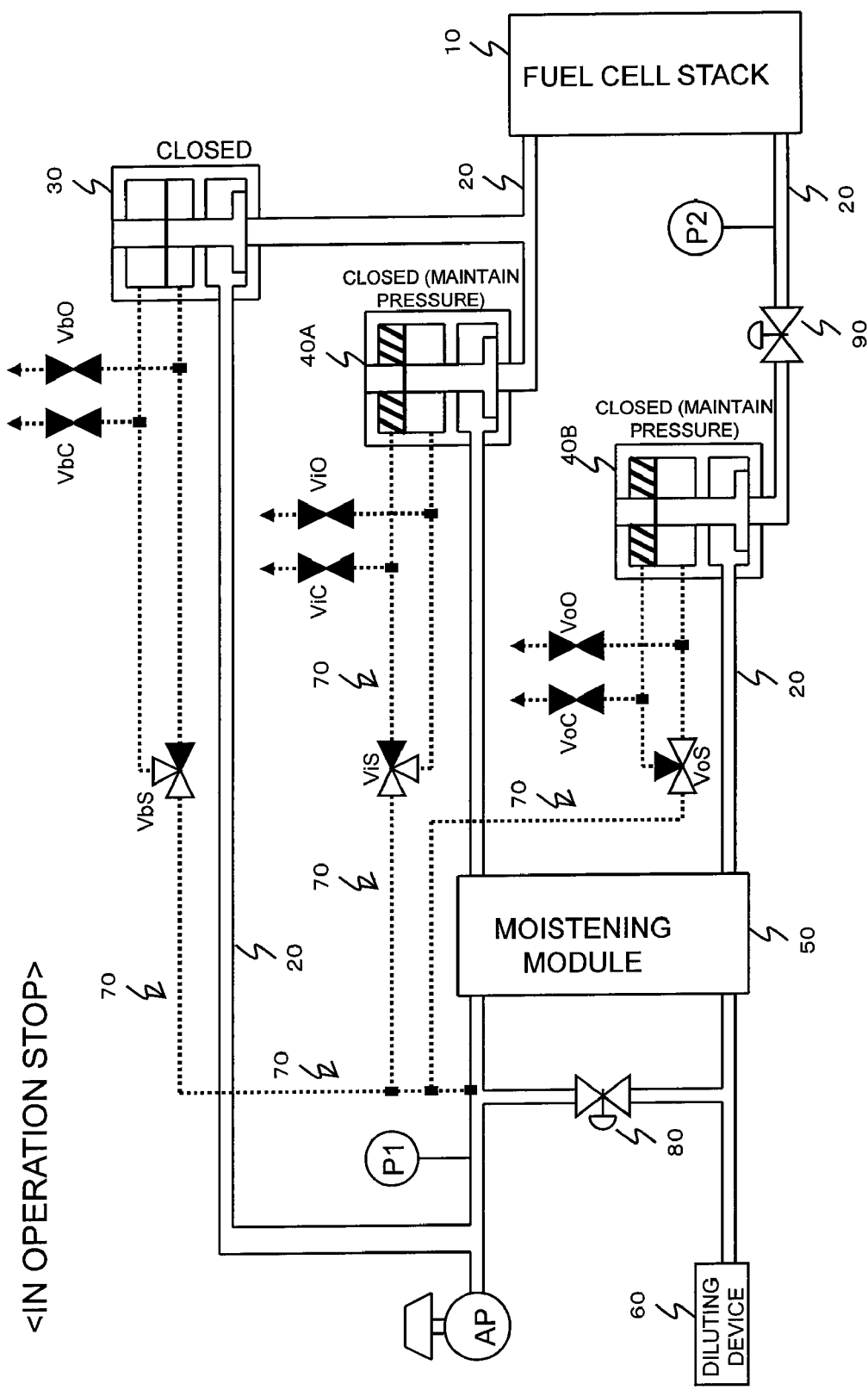
FIG. 10 shows an illustrative view of a fuel cell system to explain how it is operated while the operation is stopped.

FIG. 10 is an illustrative view of the fuel cell system of FIG. 1 to explain how it is operated while the operation is stopped, and the figure shows the fuel cell system immediately after the scavenging operation is finished (or immediately after the operation is stopped) until the instruction to resume operation is issued.

During operation stop, both entrance-side and exit-side shutoff valves 40A, B are kept closed. In this embodiment, to keep these shutoff valves 40A, B closed, the valve closing-side pressure chamber (indicated by 43 in FIG. 2) is sealed to maintain the interior pressure thereof. A process to seal and maintain the interior pressure of the pressure chamber will be described below.

After scavenging, the valve closing-side pressure chamber of the entrance-side shutoff valve 40A receives the discharge pressure of the air exhausted from the air compressor. In this state, feeding of electric current to ViS is stopped, so that the pressure control flow path 70 leading to the valve closing-side pressure chamber of the entrance-side shutoff valve 40A is shut off. At this time, ViC is in the non-conductive state, so that the flow path between the valve closing-side pressure chamber of the entrance-side shutoff valve 40A and the ambient air is also shut off. As a result, the valve closing-side pressure chamber of the entrance-side shutoff valve 40A is sealed in the pressurized state.

After that, the air compressor is stopped and feeding of electric current to ViO is also stopped. When both ViS and ViO are in the non-conductive state, the valve opening-side pressure chamber of the entrance-side shutoff valve 40A is connected with the fluid flow path 20. However, because the air compressor is stopped and the interior pressure of fluid flow path 20 is brought to atmospheric pressure, no pressure is applied on the valve opening-side pressure chamber of the entrance-side shutoff valve 40A. It is noted that after the air compressor is stopped, it is possible to depressurize the valve opening-side pressure chamber of the entrance-side shutoff valve 40A by feeding the electric current to ViO.

As a result of the above operation, as shown in FIG. 10, with ViS, ViC, and ViO being in the non-conductive state, the valve closing-side pressure chamber of the entrance-side shutoff valve 40A is kept pressurized, and the valve opening-side thereof is kept depressurized (i.e., at the atmospheric pressure). As such, force is created by the pressure difference between the valve closing-side pressure chamber and the valve opening-side pressure chamber of the entrance-side shutoff valve 40A, and this force is applied to the valving element (indicated by 41 in FIG. 2) in the direction to close the valve. If the force is greater than, for example, the spring force of the springs (indicated by 45 in FIG. 3), the entrance-side shutoff valve 40A is kept closed. As described above (see FIG. 3), another force to close the valving element, such as the negative pressure in the fuel cell stack or the freezing force, may be applied.

The exit-side shutoff valve 40B can also be kept closed by an operation similar to that described for the entrance-side shutoff valve 40A. Specifically, after scavenging (see FIG. 9), feeding of electric current to VoS is stopped, the operation of the air compressor is stopped, and feeding of electric current to VoO is stopped, so that the exit-side shutoff valve 40B is kept closed with VoS, VoC, and VoO being in the non-condution state, as shown in FIG. 10.

As described above, in this embodiment, it is possible to keep the entrance-side shutoff valve 40A closed, or keep it in the abnormal state, even with ViS, ViC, and ViO being in the non-conductive state. It is also possible to keep the exit-side shutoff valve 40B closed, or keep it in the abnormal state, even with VoS, VoC, and VoO being in the non-conductive state.

Further, the moistening M bypass valve 30 is closed when the operation is stopped. Specifically, the moistening M bypass valve 30 is closed after scavenging (see FIG. 9) and electric current is fed to VbO to depressurize the valve opening-side pressure chamber of the valve. After that, feeding of the electric current to VbO is stopped during the operation stop, as shown in FIG. 10, so that VbS, VbC, and VbO are all in the non-conductive state. It is noted that when the air compressor is stopped, the valve closing-side pressure chamber of the moistening M bypass valve 30 is not pressurized, as shown in FIG. 10. This causes the interior pressure of both the valve opening-side and closing-side pressure chambers of the moistening M bypass valve 30 to be at atmospheric pressure, so that the moistening M bypass valve 30 is kept closed (or in the normal state) by the spring force of the springs (indicated by 35 in FIG. 4). Also, as described above (see FIG. 5), another force to close the valving element, such as the negative pressure in the fuel cell stack or the freezing force, may be applied.

As such, in this embodiment, all three valves, including the entrance-side shutoff valve 40A, exit-side shutoff valve 40B, and moistening M bypass valve 30, can be maintained in the closed state, with all nine PSVs shown in FIG. 10 being in the non-conductive state.

Figure 11:
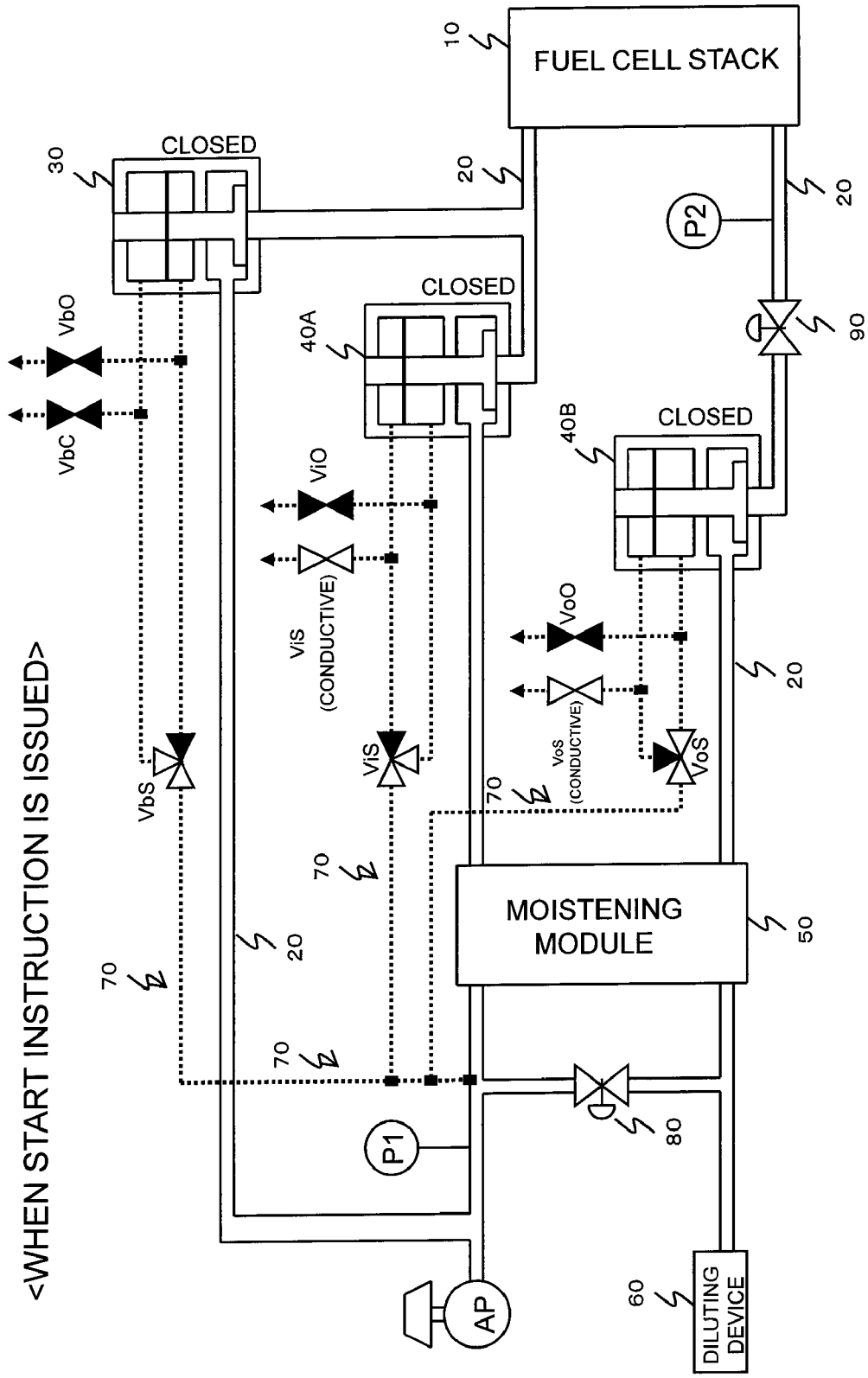
FIG. 11 shows an illustrative view of a fuel cell system to explain how it is operated when an instruction to start operation is issued.

FIG. 11 shows an illustrative view of the fuel cell system to explain how it is operated when the instruction to start operation is issued. The illustrated state is enabled by operation by users, for example, to resume operation of the fuel cell system following the operation stop state (see FIG. 10).

When the instruction to start operation is issued, a preparing operation to open the entrance-side and exit-side valves 40A, B is carried out. Specifically, electric current is fed to ViC, so as to depressurize the valve closing-side pressure chamber of the entrance-side shutoff valve 40A that is kept in the pressurized state during operation stop (see FIG. 10). The electric current is also fed to VoC, so as to also depressurize the valve closing side pressure chamber of the exit-side shutoff valve 40B that is kept in the pressurized state during operation stop (see FIG. 10).

When the start instruction is issued, the moistening M bypass valve 30 is still closed (see FIG. 10), and so is the air compressor.

Figure 12:
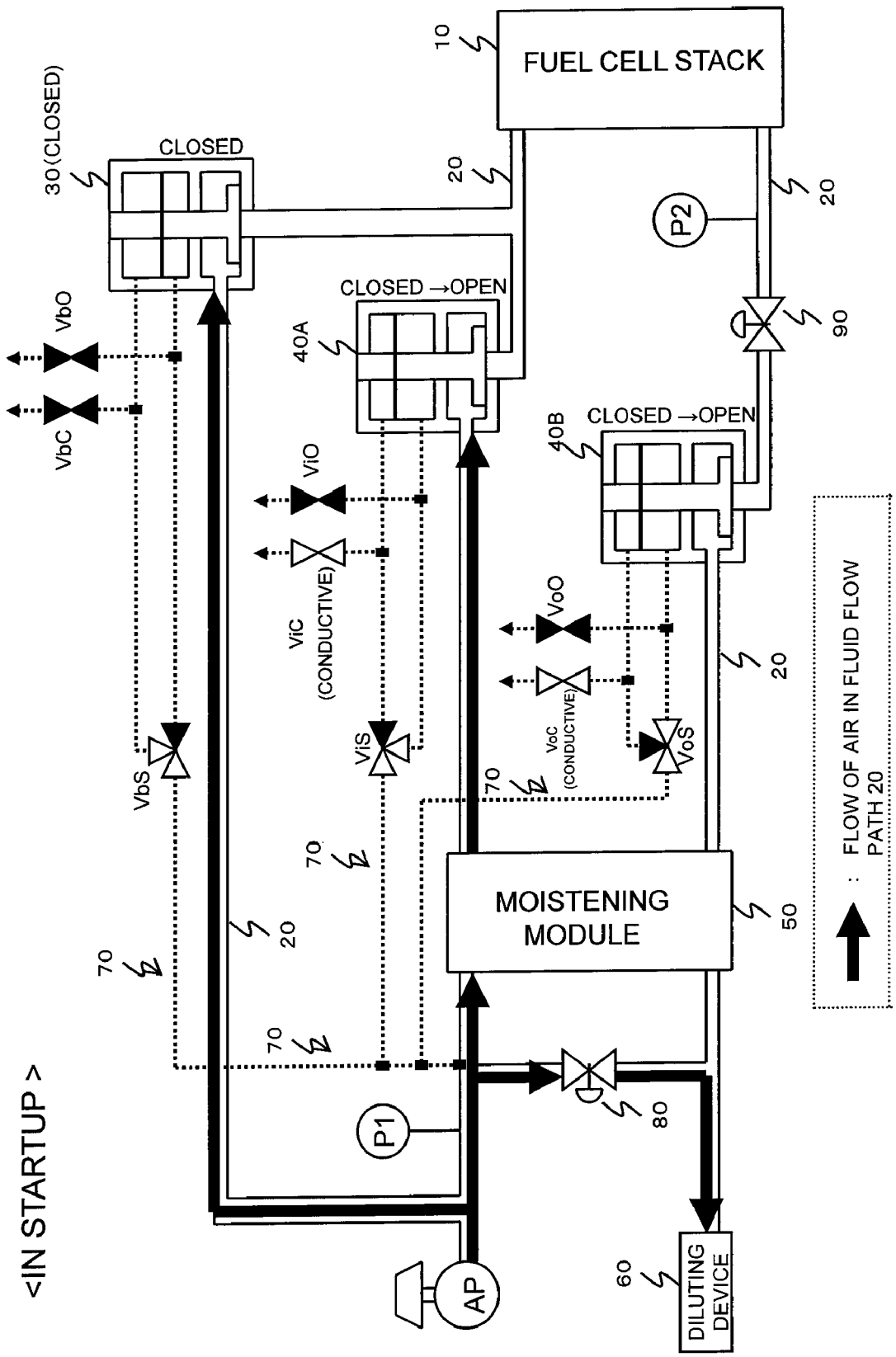
FIG. 12 shows an illustrative view of a fuel cell system to explain how it is operated upon start-up.

FIG. 12 is an illustrative view of the fuel cell system of FIG. 1 to explain how it is operated in start-up. The illustrated state is established after the start instruction is issued (see FIG. 11), and maintained until the fuel cell system starts its operation.

In start-up, the air compressor (AP) that was stopped until the start instruction is issued resumes its operation, so that the air exhausted from the air compressor is fed to the entrance-side shutoff valve 40A via the moistening module 50, and also to the moistening M bypass valve 30 and fuel cell bypass valve 80. It is noted that the discharge pressure of the air exhausted from the air compressor is appropriately controlled according to the opening angle of the valve of fuel cell bypass valve 80. The air passes through the fuel cell bypass valve 80 and is released into the ambient air via the diluting device 60.

As such, in start-up, the air compressor is activated to start the flow of air through fluid flow path 20. By the discharge pressure of the air, both the entrance-side and exit-side shutoff valves 40A, B are switched from the closed state to the open state.

The operation to open the entrance-side and exit-side shutoff valves 40A, B has been explained above (see FIG. 3). Specifically, ViS (or VoS) is in the non-conductive state, so that the valve opening-side pressure chamber (indicated by 44 in FIG. 3) is connected with the fluid flow path 20. ViO (or VoO) is in the non-conductive state, so that the flow path between the valve opening-side pressure chamber and the ambient air is shut off. Then, the electric current is fed to ViC (or VoC) to depressurize the valve closing-side pressure chamber (indicated by 43 in FIG. 3). As a result, the entrance-side and exit-side shutoff valves 40A, B are opened. After that, the fuel cell system is switched to the normal operation state, as shown in FIG. 6.

Specifically, as shown in FIG. 6, when the entrance-side and exit-side shutoff valves 40A, B are open, the air is fed into the fuel cell stack 10 via the entrance side shutoff valve 40A. After reaction, the air exhausted from the fuel cell stack 10 passes through the air pressure adjusting valve 90 to reach the exit-side shutoff valve 40B, and is discharged from there, as it is open. In the normal operation, all PSVs shown in FIG. 6 are in the non-conductive state. Specifically, the electric current is fed to ViC and VoC during start-up (see FIG. 12), but the feed of the electric current is stopped when the normal operation starts.

As described above, in the embodiment illustrated in FIGS. 6-12, each valve is controlled according to the state of fuel cell stack 10. It is noted that in the above described control process, for example, in the start-up control as shown in FIG. 11, the valve closing-side pressure chamber of the entrance-side shutoff valve 40A is depressurized by feeding electric current to ViC, and the valve closing-side shutoff valve 40B is depressurized by feeding electric current to VoC. In this embodiment, however, the valve closing-side pressure chamber may be depressurized with ViC and VoC kept closed.

Figure 13:
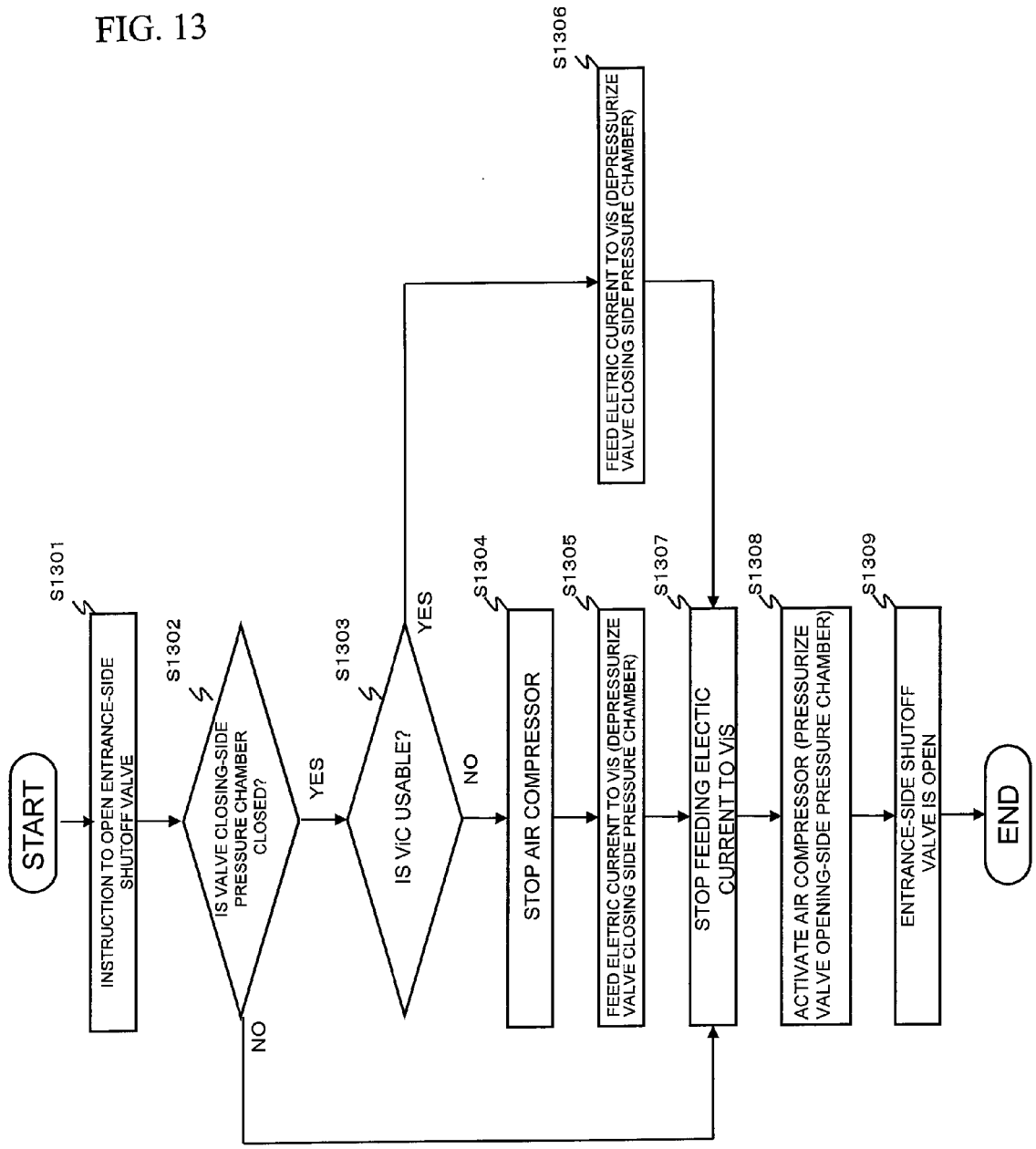
FIG. 13 shows a flow chart to explain a depressurizing operation.

FIG. 13 is a flow chart to explain the operation to depressurize the valve closing-side pressure chamber of the entrance-side shutoff valve (indicated by 40A in FIG. 1). First, when an instruction to open the entrance-side shutoff valve is issued by the control section or the like (S1301), whether or not the valve closing-side pressure chamber (indicated by 43 in FIG. 2) of the input shutoff valve is pressurized is confirmed (S1302). If the valve closing-side pressure chamber is not pressurized, the depressurizing operation is skipped and the process goes to S1307 where the valve opening operation is carried out.

If the valve closing-side pressure chamber is pressurized, whether or not the depressurizing valve, ViC, is usable is confirmed (S1303). If ViC is usable, electric current is fed to ViC to depressurize the valve closing-side pressure chamber (S1306)

On the other hand, if disconnections or the like are found in the wiring for feeding the electric current to ViC, it is determined that ViC is defective and unusable. It is noted that, in this embodiment, even if ViC is not present, or the pressure control flow path 70 is always closed when ViC is arranged as shown in FIG. 1, the valve closing side pressure chamber of the entrance-side shutoff valve can be depressurized by the procedures described below.

If ViC is unusable because of defects or the like, or ViC is not present, the air compressor (AP) is stopped (S1304). Then, electric current is fed to ViS to connect the valve closing-side pressure chamber with the fluid flow path. At this time, the air compressor is being stopped and the interior of the fluid flow path is at atmospheric pressure, so that the valve closing-side pressure chamber can be depressurized by connecting the valve closing-side pressure chamber with the fluid flow path (S1305).

When the depressurization of the valve closing-side pressure chamber is finished, feeding of electric current to ViS is stopped (S1307). By switching ViS to the non-conductive state, the valve opening-side pressure chamber is connected with the fluid flow path. In this state, the air compressor is activated and applies pressure to the valve opening side pressure chamber (S1308), thereby creating a pressure difference between the valve opening-side pressure chamber and the depressurized valve closing-side pressure chamber. As a result, the entrance-side shutoff valve is open (S1309).

As shown in FIG. 13, the depressurization of the valve closing-side pressure chamber of the entrance shutoff valve can be carried out without using ViC. This depressurization process may be applied to depressurize the valve opening-side pressure chamber of the entrance-side shutoff valve or other pressure chambers. Specifically, after stopping the air compressor, VbS, ViS, or VoS are appropriately operated to connect the pressure chamber that needs to be depressurized with the fluid flow path.

In the fuel cell system shown in FIG. 1, one end of each depressurization PSV (VbC, VbO, ViC, ViO, VoC, VoO) is connected with the pressure control fluid flow path 70 leading to the pressure chamber, and the other end of the valve is connected to the ambient air. Instead, the other end of the depressurizing PSV may be connected upstream of the air compressor.

Figure 14:
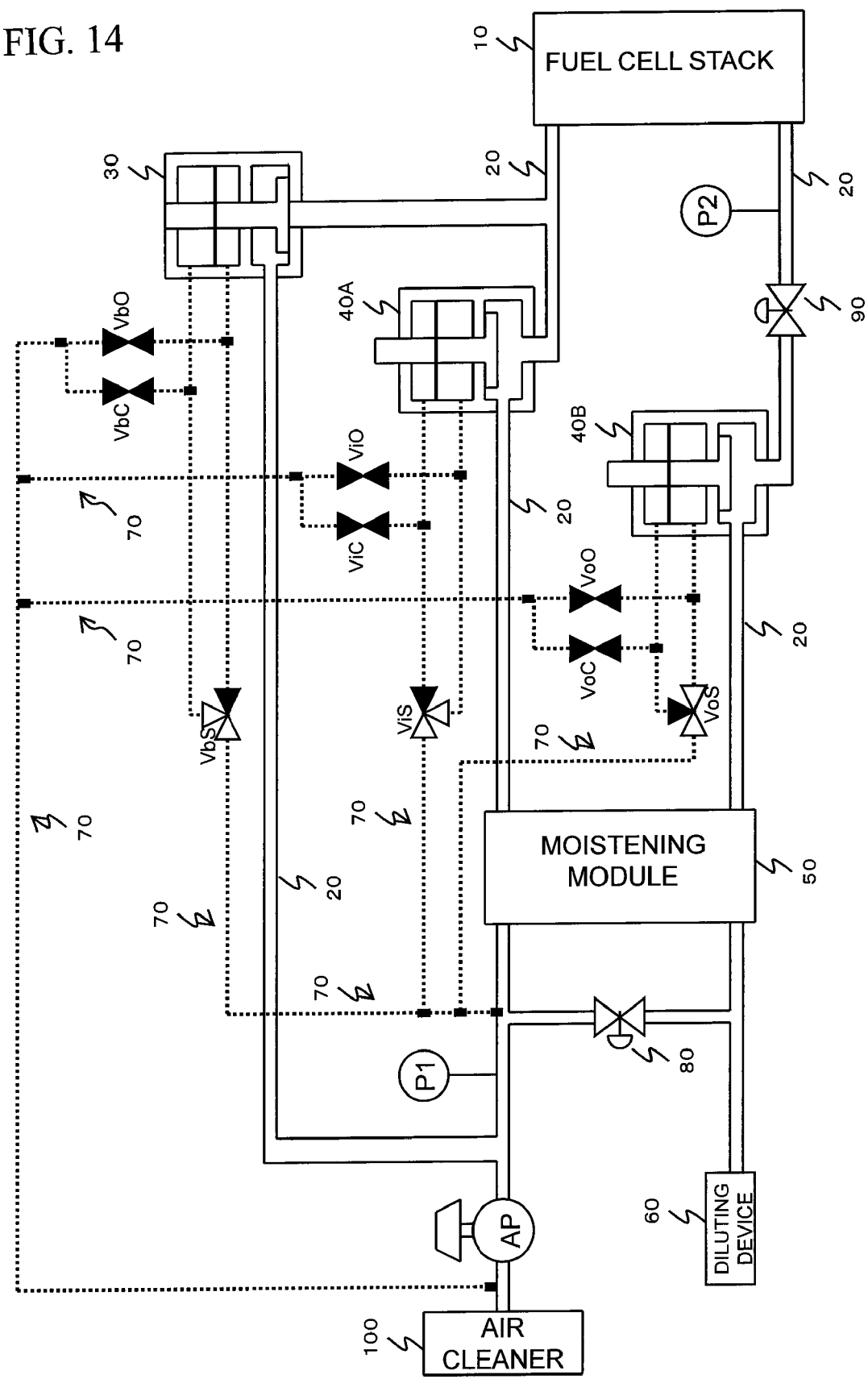
FIG. 14 shows an overall illustrative view of a fuel cell system in which depressurizing PSVs are connected with the upstream side of an air compressor.

FIG. 14 shows an overall illustrative view of the fuel cell system in which the depressurizing PSVs are connected at an upstream side of the air compressor. In the fuel cell system of FIG. 14, the other end of each depressurizing PSV (VbC, VbO, ViC, ViO, VoC, VoO) is connected upstream of the air compressor (AP) via the pressure control fluid flow path 70.

The air compressor sucks in air from the ambient air through the fluid flow path 20 via the air cleaner 100. When the air compressor is in operation, the discharge pressure is created at the downstream side of the air compressor (or in the side of pressure gauge P1). In contrast, negative force is created upstream of the air compressor.

In the fuel cell system shown in FIG. 1, electric current is fed to each depressurizing PSV to establish the flow path between the corresponding pressure chamber associated with each PSV and the ambient air, so as to depressurize the pressure chamber.

On the other hand, in the fuel cell system shown in FIG. 14, the depressurization of the pressure chamber is carried out by utilizing the negative pressure created at the upstream side of the air compressor. Specifically, electric current is fed to the depressurizing PSV to establish the flow path between the corresponding pressure chamber associated with the pressure chamber and the upstream side of the air compressor. As a result, the negative pressure is created at the upstream side of the air compressor and the pressure chamber is depressurized using the negative pressure.

In the configuration of FIG. 14, the pressure control flow path 70 is preferably connected near the air compressor. It is noted that the rest (or other components) of the fuel cell system of FIG. 14 is similar to the fuel cell system of FIG. 1, and the description thereof will not be repeated.

While the present invention has been described in connection with the preferred embodiment thereof, it will be understood that the foregoing is to be considered as only being an illustrative embodiment of this disclosure and is not intended to limit the invention to that embodiment. On the contrary, it is intended to cover all alternatives, modifications, and equivalents as may be included within the spirit and scope of the invention as defined by the appended claims.

What is claimed is:
1. A fuel cell system, comprising:
a fuel cell;
a fluid flow path connected to the fuel cell; and
a fluid control valve provided in the fluid flow path, the fluid control valve including a valving element activated in response to a pressure difference between a valve opening pressure and a valve closing pressure,
a pressure chamber comprising an opening-side pressure chamber for applying the valve opening pressure to the valving element and a closing-side pressure chamber for applying the valve closing pressure to the valving element,
wherein the pressure chamber is sealed to maintain the open/closed state of the valving element, and
wherein both the opening-side pressure chamber and the closing-side pressure chamber interact with the valving element via a diaphragm.

2. A fuel cell system according to claim 1, wherein
one valve pressure, of the valve opening pressure and the valve closing pressure, of the fluid control valve is greater than the other valve pressure in a normal state, and the other valve pressure is greater than the one valve pressure when the pressure chamber corresponding to the other valve pressure is sealed in an abnormal state.

3. A fuel cell system according to claim 2, wherein
the fluid control valve is a normally-open type valve in which the valve opening pressure is greater than the valve closing pressure to keep the valving element open in the normal state, and the fluid control valve is provided on at least one of an entrance side and an exit side for a fluid of the fuel cell, and functions as a shutoff valve as it switches the valving element to the closed state when the valve closing pressure is greater than the valve opening pressure in the abnormal state.

4. A fuel cell system according to claim 2, wherein
the fluid control valve has two pressure chambers including a valve opening-side pressure chamber corresponding to the valve opening pressure, and a valve closing-side pressure chamber corresponding to the valve closing pressure.

5. A fuel cell system according to claim 4, further comprising
a three way valve for selectively connecting one pressure chamber, of the two pressure chambers of the fluid control valve, with the fluid flow path, wherein an interior pressure of the two pressure chambers is controlled by utilizing a pressure of the fluid transmitted via the three way valve.

6. A fuel cell system according to claim 5, wherein
the three way valve connects one of the two pressure chambers of the fluid control valve with the fluid flow path in an uncontrolled state, and the other pressure chamber of the two pressure chambers of the fluid control valve with the fluid flow path in a controlled state.

7. A fuel cell system according to claim 6, wherein
of the valve opening pressure and the valve closing pressure of the fluid control valve, the pressure chamber corresponding to one valve pressure greater than the other valve pressure in the normal state is connected with the fluid flow path, so that the interior of the pressure chamber is pressurized to maintain the fluid control valve in the normal state.

8. A fuel cell system according to claim 4, wherein
the interior of one pressure chamber of the two pressure chambers of the fluid control valve is depressurized, followed by pressurizing the interior of the other pressure chamber, to switch the fluid control valve from the normal state to the abnormal state, and vice versa.

9. A fuel cell system according to claim 1, further comprising:
- a compressor for circulating a fluid through the fluid flow path; and
- a depressurizing flow path for connecting the pressure chamber of the fluid control valve with an upstream side of the compressor,
- wherein the pressure chamber of the fluid control valve is depressurized by utilizing a pressure from the upstream side of the compressor, which is smaller than the pressure from a downstream side of the compressor.

10. A fuel cell system according to claim 1, wherein the pressure chamber of the fluid control valve is connected with the fluid flow path, following stopping of a compressor for circulating the fluid through the fluid flow path, to depressurize the interior pressure of the pressure chamber of the fluid flow valve.

11. A fuel cell system according to claim 10, further comprising:
- a depressurizing valve for depressurizing the interior pressure of the pressure chamber of the fluid control valve,
- wherein when an abnormal condition occurs in the depressurizing valve of the fluid control valve, the compressor is stopped and the pressure chamber of the fluid control valve is connected with the fluid flow path to depressurize the interior pressure of the pressure chamber.

12. A fuel cell system, comprising:
- a fuel cell;
- a fluid flow path connected to the fuel cell; and
- a fluid control valve provided in the fluid flow path, the fluid control valve including
- a valving element activated in response to a pressure difference between a valve opening pressure and a valve closing pressure,
- wherein the fluid control valve is provided on at least one of an entrance side and an exit side of a fluid for the fuel cell, and the valving element of the fluid control valve is closed after a power generating operation of the fuel cell is stopped, so that the at least one of the entrance side and the exit side of the fuel cell is sealed;
- wherein the fluid control valve includes a pressure chamber comprising an opening-side pressure chamber for applying the valve opening pressure to the valving element and a closing-side pressure chamber for applying the valve closing pressure to the valving element,
- wherein the pressure chamber is sealed to maintain the open/closed state of the valving element, and
- wherein both the opening-side pressure chamber and the closing-side pressure chamber interact with the valving element via a diaphragm.

13. A fuel cell system according to claim 12, wherein at least one of the valve opening pressure and the valve closing pressure of the fluid control valve is controlled by utilizing the pressure of the fluid flowing through the fluid flow path.

* * * * *